(12) United States Patent
Fisher

(10) Patent No.: US 7,734,068 B2
(45) Date of Patent: Jun. 8, 2010

(54) ELECTRONIC LOCK BOX USING A BIOMETRIC IDENTIFICATION DEVICE

(75) Inventor: Scott R. Fisher, West Chester, OH (US)

(73) Assignee: Sentrilock, Inc., Cincinnati, OH (US)

( * ) Notice: Subject to any disclaimer, the term of this patent is extended or adjusted under 35 U.S.C. 154(b) by 897 days.

(21) Appl. No.: 11/585,038

(22) Filed: Oct. 23, 2006

(65) Prior Publication Data

US 2007/0096870 A1    May 3, 2007

Related U.S. Application Data

(60) Provisional application No. 60/730,536, filed on Oct. 26, 2005.

(51) Int. Cl.
*G06K 9/00* (2006.01)
(52) U.S. Cl. ...................................... 382/115
(58) Field of Classification Search .......... 382/115–127
See application file for complete search history.

(56) References Cited

U.S. PATENT DOCUMENTS

| | | | |
|---|---|---|---|
| 4,808,993 A | 2/1989 | Clark | 340/825.31 |
| 5,377,906 A | 1/1995 | Mason | 232/34 |
| 6,850,147 B2 | 2/2005 | Prokoski et al. | 340/5.53 |
| 6,957,339 B2 | 10/2005 | Shinzaki | 713/186 |
| 6,989,732 B2 | 1/2006 | Fisher | 340/3.1 |
| 7,009,489 B2 | 3/2006 | Fisher | 340/5.7 |
| 7,086,258 B2 | 8/2006 | Fisher et al. | 70/278.7 |
| 7,269,277 B2 * | 9/2007 | Davida et al. | 382/117 |
| 2003/0231103 A1 * | 12/2003 | Fisher | 340/5.73 |
| 2004/0025039 A1 | 2/2004 | Kuenzi et al. | 713/193 |
| 2004/0208349 A1 * | 10/2004 | Ide | 382/124 |
| 2006/0225140 A1 * | 10/2006 | Mergenthaler | 726/28 |

* cited by examiner

*Primary Examiner*—Brian P Werner
(74) *Attorney, Agent, or Firm*—Frederick H. Gribbell

(57) ABSTRACT

An improved electronic lock box system is provided for more secure control over the accessibility of a secure compartment in the electronic lock box, which is typically used to store a dwelling key. The new system uses biometric identification sensors to determine if the correct, authorized user is attempting to access the secure compartment of the electronic lock box. In one embodiment, the biometric identification sensor uses thermal scanning to detect a person's fingerprint pattern. This is compared to previously stored (enrollment) biometric identification information/data, and if the "live" (observed) biometric identification information/data sufficiently correlates to the stored enrollment biometric identification information/data, access will be granted.

27 Claims, 11 Drawing Sheets

ELECTRONIC LOCK BOX USING A BIOMETRIC IDENTIFICATION DEVICE

CROSS-REFERENCE TO RELATED APPLICATIONS

The present application claims priority to provisional patent application Ser. No. 60/730,536, titled "ELECTRONIC LOCK BOX WITH BIOMETRIC IDENTIFICATION DEVICE," filed on Oct. 26, 2005.

TECHNICAL FIELD

The present invention relates generally to electronic lock equipment and is particularly directed to an electronic lock box of the type that contains a secure compartment for storing keys that allow entry to a structure or other objects. The invention is specifically disclosed as an electronic lock box system that uses biometric sensors to determine if the correct, authorized user is attempting to access the secure compartment of the electronic lock box. In one embodiment, the biometric sensor uses thermal scanning to detect a person's fingerprint pattern.

BACKGROUND OF THE INVENTION

All of the real estate electronic lock box systems in use today guard against unauthorized use by requiring the real estate agent to enter a personal identification code (PIN) at some point during the lock access process. PIN security is the weakest link in the overall device security since PIN's can be freely shared by individuals, or stolen by observation. PIN's can also be undesirable because the necessity of a fairly short number of digits to satisfy the convenience of memorization by the user leaves the number of possible PIN permutations small, and therefore, fairly easy to guess.

SUMMARY OF THE INVENTION

Accordingly, it is an advantage of the present invention to improve upon the current electronic lock box state of the art by eliminating the insecurity of PIN code protection and, instead, enhancing security through the use of biometric identification. The biometric identification data can be coupled with existing electronic keys, smart card technology, or wireless technology to facilitate the comparison and authorization of lock system functions.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for operating an electronic lock box system is provided, in which the method comprises the following steps: providing an electronic lock box with a secure compartment therein, a shackle for attachment to a fixed object, a processing circuit, and a memory circuit; providing a biometric identification device that determines observed biometric identification data of a user; storing enrollment biometric identification data in the electronic lock box memory circuit identifying at least one authorized user of the electronic lock box; collecting the observed biometric identification data from a user of the electronic lock box, before at least one operation of the electronic lock box; and preventing operation of the electronic lock box if the observed biometric identification data does not sufficiently correlate to the enrollment biometric identification data stored for an authorized user of the electronic lock box.

In accordance with another aspect of the present invention, a method for operating an electronic lock box system is provided, in which the method comprises the following steps: providing an electronic lock box with a secure compartment therein, a shackle for attachment to a fixed object, a first communications port, and a first processing circuit; providing an external portable computer having a second communications port, a second processing circuit, and a memory circuit; providing a biometric identification device that determines observed biometric identification data of a user; storing enrollment biometric identification data in the external portable computer memory circuit identifying at least one authorized user of the electronic lock box; collecting the observed biometric identification data from a user of the electronic lock box, before at least one operation of the electronic lock box; and preventing operation of the electronic lock box if the observed biometric identification data does not sufficiently correlate to the enrollment biometric identification data stored for an authorized user of the electronic lock box.

In accordance with yet another aspect of the present invention, a method for operating an electronic lock box system is provided, in which the method comprises the following steps: providing an electronic lock box with a secure compartment therein, a shackle for attachment to a fixed object, and a processing circuit; providing a portable memory device; providing a biometric identification device that determines first biometric identification data of a user; providing a display device for displaying electronic lock box system information; and conditionally displaying a secure compartment access code on the display device if a sufficient correlation occurs between the first biometric identification data, and second biometric identification data that has been stored in the portable memory device.

In accordance with still another aspect of the present invention, a method for operating an electronic lock box system is provided, in which the method comprises the following steps: providing an electronic lock box with a secure compartment therein, a shackle for attachment to a fixed object, and a processing circuit; providing a portable memory device, which interfaces to the electronic lock box processing circuit; providing a biometric identification device that determines first biometric identification data of a user; providing a communications link used for exchanging data between (a) the biometric identification device, and (b) one of: (i) the electronic lock box processing circuit, and (ii) the portable memory device; and authorizing secure compartment access if a sufficient correlation occurs between the first biometric identification data, and second biometric identification data that has been stored in the portable memory device.

In accordance with a further aspect of the present invention, a method for operating an electronic lock box system is provided, in which the method comprises the following steps: providing an electronic lock box with a secure compartment therein, a shackle for attachment to a fixed object, and a processing circuit; providing a portable memory device, which interfaces to the electronic lock box processing circuit; providing a biometric identification device that determines first biometric identification data of a user; providing an external portable computer that is in communication with the biometric identification device; and authorizing secure compartment access if a sufficient correlation occurs between the first biometric identification data, and second biometric identification data that has been stored in the portable memory device, by sending an authorization message from the external portable computer to one of: (a) the electronic lock box processing circuit, and (b) the portable memory device.

In accordance with a yet further aspect of the present invention, a method for operating an electronic lock box system is provided, in which the method comprises the following steps: providing an electronic lock box with a secure compartment therein, a shackle for attachment to a fixed object, a first communications port, and a first processing circuit; providing a portable memory device, which interfaces to the electronic lock box processing circuit; providing a biometric identification device that determines observed biometric identification data of a user; providing a central computer, having a second processing circuit, a second communications port, and a central database that is accessible using the second processing circuit, the central database containing enrollment biometric identification data for a plurality of human users; providing an external portable computer that is in communication with the biometric identification device, and having a third communications port, a fourth communications port, and a third processing circuit; providing a first communications link between the second communications port and the third communications port; providing a second communications link between the first communications port and the fourth communications port; scanning a biometric characteristic of the user, using the biometric identification device, and determining the observed biometric identification data; transferring the observed biometric identification data from the biometric identification device to the external portable computer; transferring the observed biometric identification data from the external portable computer to the central computer; comparing, at the central computer, the observed biometric identification data to the enrollment biometric identification data stored in the central database, and if there is a sufficient correlation between the enrollment biometric identification data and the observed biometric identification data, transmitting an authorization message from the central computer to the external portable computer over the first communications link; writing authorization code data on the portable memory device, under control of the external portable computer; placing the portable memory device in communication with the first processing circuit of the electronic lock box, using the second communications link; and determining if the portable memory device contains correct authorization data to access the secure compartment of the electronic lock box, and if so authorizing access to the secure compartment.

In accordance with a still further aspect of the present invention, a method for operating an electronic lock box system is provided, in which the method comprises the following steps: providing an electronic lock box with a secure compartment therein, a shackle for attachment to a fixed object, and a processing circuit; providing a biometric identification device that determines first biometric identification data of a user; providing an external portable computer that exchanges data with the biometric identification device; providing a communications link used for exchanging data between the external portable computer and the electronic lock box processing circuit; and authorizing secure compartment access if a sufficient correlation occurs between the first biometric identification data, and second biometric identification data that has been stored in the external portable computer.

In accordance with yet another aspect of the present invention, a method for operating an electronic lock box system is provided, in which the method comprises the following steps: providing an electronic lock box with a secure compartment therein, a shackle for attachment to a fixed object, and a processing circuit; providing a wireless communication device; providing a biometric identification device that determines first biometric identification data of a user; communicating the first biometric identification data to a central computer system; providing a display device for displaying lock system information; and conditionally displaying a secure compartment access code data on the display device if a sufficient correlation occurs between the first biometric identification data and second biometric identification data that has been stored in the central computer system.

In accordance with still another aspect of the present invention, a method for operating an electronic lock box system is provided, in which the method comprises the following steps: providing an electronic lock box with a secure compartment therein, a shackle for attachment to a fixed object, and a processing circuit; providing a wireless communication device; providing a biometric identification device that determines observed biometric identification data of a user; providing a central computer system having a memory circuit that stores enrollment biometric identification data of a plurality of users; providing a first communications link used for exchanging data between the biometric identification device and the wireless communication device; providing a second communications link used for exchanging data between the wireless communication device and the central computer system; transmitting observed biometric identification data to the central computer system; and transmitting authorization data from the central computer system if a sufficient correlation occurs between the observed biometric identification data and enrollment biometric identification data that has been stored in the central computer system.

In accordance with a further aspect of the present invention, a method for operating an electronic lock box system is provided, in which the method comprises the following steps: providing an electronic lock box with a secure compartment therein, a shackle for attachment to a fixed object, and a processing circuit; providing a wireless communication device; providing a biometric identification device that determines observed biometric identification data of a user; providing a central computer system having a memory circuit that stores enrollment biometric identification data of a plurality of users; providing a first communications link used for exchanging data between the biometric identification device and the wireless communication device; providing a second communications link used for exchanging data between the wireless communication device and the central computer system; upon inquiry by the wireless communication device, transmitting enrollment biometric identification data from the central computer system to the wireless communication device; and authorizing secure compartment access if a sufficient correlation occurs between the observed biometric identification data and the enrollment biometric identification data downloaded from the central computer system.

In accordance with a yet further aspect of the present invention, a method for operating an electronic real estate electronic lock box system is provided, in which the method comprises the following steps: providing an electronic lock box having a shackle for attachment to a fixed object and having a secure compartment therein for containing a dwelling key, and a processing circuit; providing an electronic key having the capability to communicate with the electronic lock box and, if properly authorized, to obtain access to its secure compartment; providing a biometric identification device integral to the electronic key; storing enrollment biometric identification data in the electronic key identifying at least one authorized user of the electronic key; collecting observed biometric identification data from a user of the electronic key, before at least one electronic key operation; and preventing operation of the electronic key if the observed biometric identification data does not sufficiently correlate to the enrollment biometric identification data stored for an authorized user of the electronic key.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
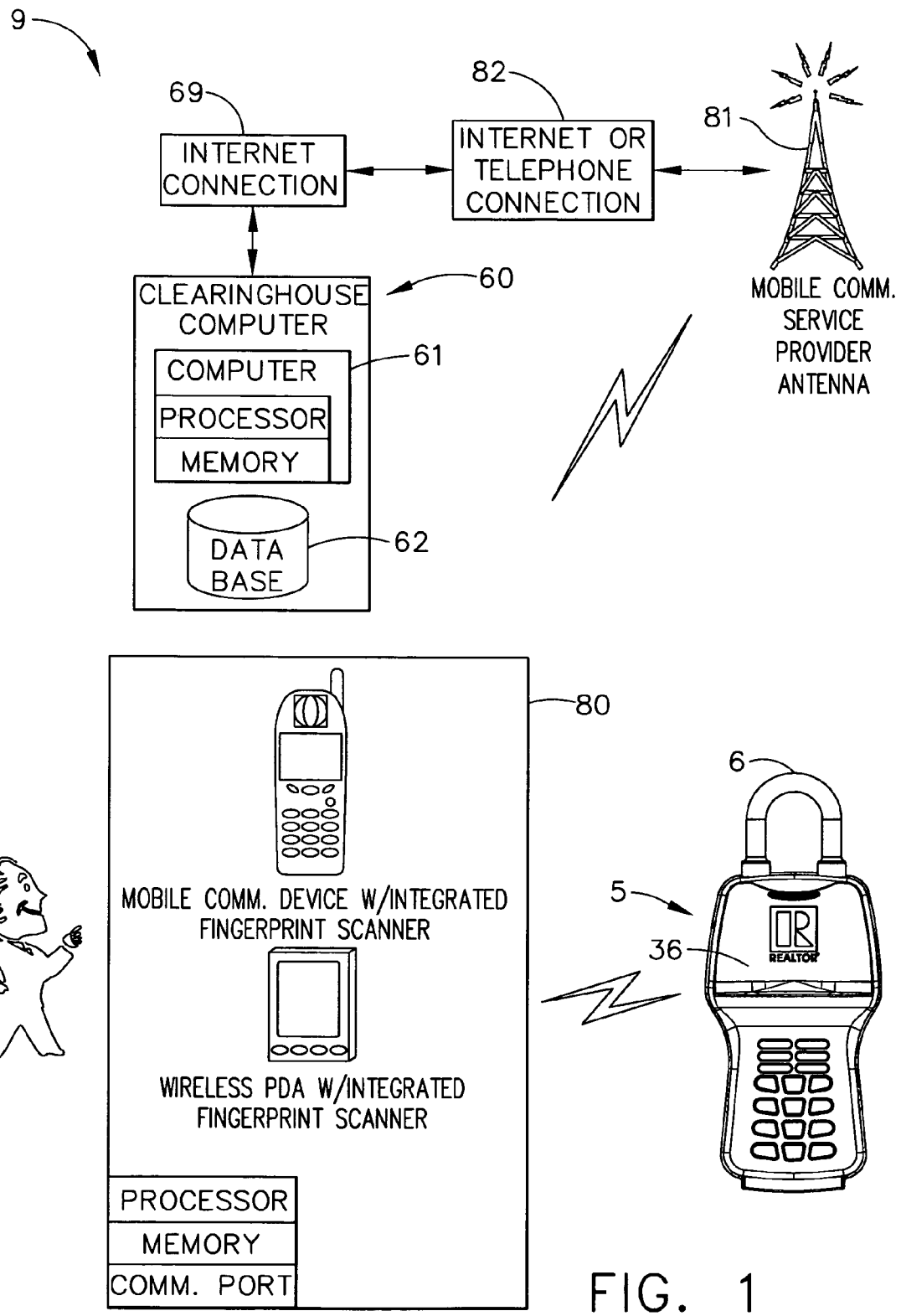
FIG. 1 is a diagrammatic view of the major components of a portable electronic lock box security system, as constructed according to the principles of the present invention, including a clearinghouse computer station, a wireless communications device, and a portable electronic lock box apparatus.

Reference will now be made in detail to the present preferred embodiment of the invention, an example of which is illustrated in the accompanying drawings, wherein like numerals indicate the same elements throughout the views.

The present invention supports various distinct electronic lock box access methodologies. One methodology uses a system of conditional access code that are disclosed to the user for controlling electronic lock box key compartment access. The access code is conveyed securely from the electronic lock box to a portable computer via a secure memory device (also referred to as a "secure memory card"); moreover, the access code is generated as a random number (by the electronic lock box) and is generated in real time as the attempted access is in progress. Depending on expiration status and other factors, the portable computer determines whether the electronic lock box access code should be revealed to the user. The portable computer, in this embodiment, generally is able to interface to and "read" the contents of the secure memory card, and also can "write" data into the memory elements of the secure memory card.

Another methodology also uses a system of conditional access code that are disclosed to the user for controlling electronic lock box key compartment access. The access code is conveyed to the electronic lock box by a keypad entry by a human user. In addition, further data is sent to the electronic lock box from securely from a portable secure memory card; in general this further data involves the passage of real time, and whether or not the secure memory card is still "up to date." In a preferred mode of the invention, the secure memory card must be periodically renewed, so that if it is either lost or stolen, it will eventually "expire" and no longer be usable with any electronic lock boxes, even if a correct access code is entered by a user.

In another mode of the invention, electronic lock box access codes are randomly-generated, and are good for only a single key compartment access operation that occurs within a highly limited time window. Such an access code automatically expires whether used or unused, thus making the system highly secure. Furthermore, the access code is only revealed to a user who has an active identification (ID) card, which contains random access memory (RAM) that receives the access code from the electronic lock box through a card plug-in module. This ID card will also be referred to herein as a "secure memory card" or a "smart card;" such a smart card is generally designated on FIG. 1 by the reference numeral 3.

In another mode of the invention, the user removes the ID card 3 from the electronic lock box card plug-in module and now inserts the ID card 3 into a small portable computer. If the user's ID card 3 has expired, the portable computer will not display the necessary electronic lock box access code information. If the ID card 3 has not expired, the portable computer will display the access code information after the user enters a secret personal identification code. After the lock access code has been delivered to the user, the code is entered on the electronic lock box by pressing keys on the electronic lock box's integral keypad.

In one embodiment disclosed below, the portable computer comprises a small computer system 10 that contains a microcomputer and associated memory, as well as a liquid crystal display (LCD) that communicates information to the user. This methodology is advantageous as it eliminates the bulky and expensive electronic key found in many conventional systems used at the present time. The user only has to carry a credit card-sized portable computer and a secure memory "smart card" for identification to the lock system.

Another methodology of access control involves the use of mobile communication technology, a central clearinghouse computer, and regularly changing access codes in the electronic lock box in which the electronic lock box's access codes change at regular time intervals to ensure security. The progression of access codes is governed by a algorithmic system known to both the electronic lock box and central clearinghouse computer. The electronic lock box employs a temperature compensated clock oscillator to ensure time synchronization of both the electronic lock box and central clearinghouse computer. Delivery of the access code in this method can be done through virtually any mobile communication technology available, including cellular phone via synthesized voice, numeric and alphanumeric pager, and a wireless Internet connection. After the lock access code has been delivered to the user, the code is entered on the electronic lock box by pressing keys on the electronic lock box's integral keypad. This method is advantageous as it also eliminates the bulky and expensive electronic key found in many conventional systems used at the present time.

Referring now to the drawings, FIG. 1 shows an electronic lock box system, generally designated by the reference numeral 9, as constructed according to the present invention. The system 9 includes one or more electronic lock boxes 5, perhaps one or more secure memory cards (not shown on FIG. 1), portable computer devices 80, a central clearinghouse computer system 60, and a wireless data communications system, represented by Internet® connections 69 and 82, and a mobile phone provider 81. The central clearinghouse computer 80 typically will include a database 62 which contains a repository of electronic lock box identification and attribute information, and also contains a repository of information about real estate agents. A computer 61 controls the database 62, and includes a processing circuit and a memory circuit (in addition to any bulk memory storage devices that contain the database 62).

Figure 2:
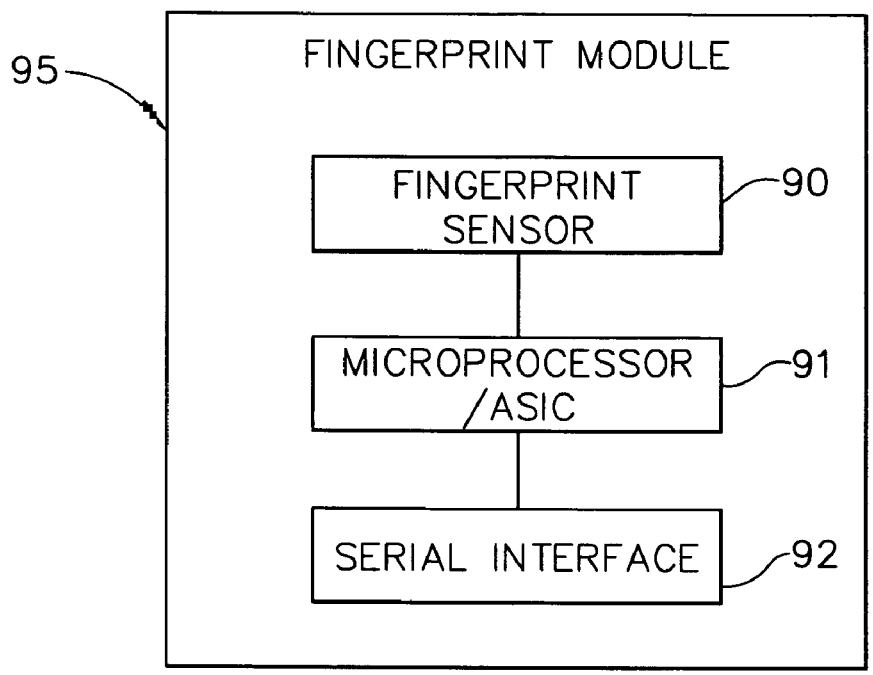
FIG. 2 is a schematic block diagram of a fingerprint sensing module used in the portable electronic lock box security system of FIG. 1.

Referring now to FIG. 2, an electronic lock box 5 contains a door key to the dwelling (e.g., a house or condo) and electronic lock box 5 typically is attached to a fixed object (e.g., a door knob) on or proximal to the dwelling via an electronic lock box shackle 6. In some modes of the present invention, the secure memory card 3 is used by the individual (e.g., a real estate agent) desiring access to the dwelling or home as an identification mechanism, as well as a secure transport medium to exchange information with the portable computer device 80.

In general, electronic lock box access code information disclosed (e.g., displayed) by the portable computer device 10 is used by the user to gain access to the key compartment of the electronic lock box 5. The secure memory card 3 can also be used by a user to download access log data from the electronic lock box 5 (which has been stored in a memory device in the electronic lock box) for future processing by the user on an "office" computer (which could be virtually any type of PC-style personal computer or workstation). This office computer (not shown) would have an associated display monitor and keyboard, and typically would be placed in a REALTOR's office.

The portable computer device 10 includes the capability to interface to a cradle that holds a cable connector that is used to connect the portable computer 10 to the office computer through a serial data cable. A PC smart card reader is typically used in high traffic locations, such as offices where frequent updating of the secure memory card 3 is necessary or desirable. The office computer is used to communicate with a central clearinghouse computer system 60 via the Internet, or other network, to manage the information flow between the portable computer device 10, secure memory card 3, and in some instances through the PC smart card reader.

Figure 4:
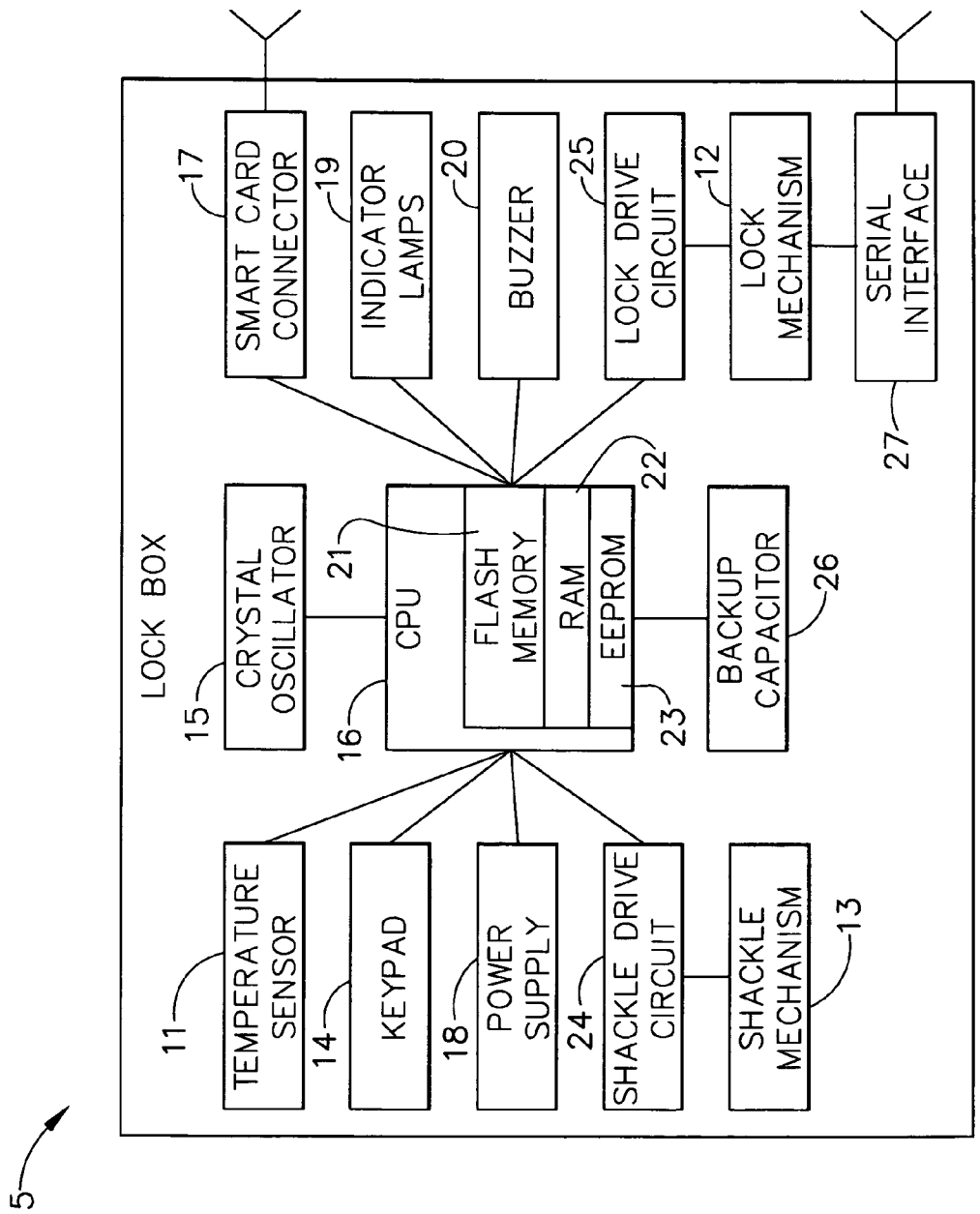
FIG. 4 is a schematic block diagram of an electronic lock box used in the portable electronic lock box security system of FIG. 1.

Description of Electronic Lock Box:

The electronic circuitry of electronic lock box 5 is illustrated in block diagram form in FIG. 4. Electronic lock box 5 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip) a shackle drive circuit 24, a shackle release mechanism 13, a key compartment mechanism drive circuit 25, a key compartment lock/release mechanism 12, and a membrane style keypad 14 for user data entry. A serial interface 27 is also included so that the CPU 16 is able to communicate with other external devices, such as a separate portable computer in the form of a PDA (personal digital assistant) or other type of portable computing device that uses a serial data link. For example, serial interface 27 can comprise in infrared (IR) port that communicates with a standard IR port found on many PDA's; or it could use a different communications protocol, such as BlueTooth.

Microprocessor 16 controls the operation of the electronic lock box 5 according to programmed instructions (electronic lock box control software) stored in a memory device, such as in FLASH memory 21. RAM memory 22 is typically used to store various data elements such as counters, software variables and other informational data. EEPROM memory 23 is typically used to store more permanent electronic lock box data such as serial number, configuration information, and other important data. It will be understood that many different types of microprocessors or microcontrollers could be used in the electronic lock box system 5, and that many different types of memory devices could be used to store data in both volatile and non-volatile form, without departing from the principles of the present invention. In one mode of an exemplary embodiment, the electronic lock box CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lock box. Capacitor 26 is used to provide temporary memory retention power during replacement of battery 18. It will be understood that an alternative electrical power supply could be used if desired, such as a solar panel with the memory backup capacitor.

Electronic lock box 5 includes a shackle 6 that is typically used to attach the box 5 to a door handle or other fixed object. Electronic lock box 5 also includes a key compartment 10 which typically holds a dwelling key (not shown), and which can be accessed via a key access door 36 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 6 and key compartment 36 can be constructed of many different types of mechanical or electromechanical devices without departing from the principles of the present invention.

The crystal oscillator 15 provides a steady or near-constant frequency (e.g., at 32.768 kHz) clock signal to CPU 16's asynchronous timer logic circuit. The ISO-7816 smart card connector 17 connects to smart card contacts 33 to allow the exchange of data between the electronic lock box's CPU 26 and the memory devices 31 in the smart card 3 (discussed below in greater detail). The smart card 3 itself typically will include some control logic circuits 32, to prevent "easy" or unauthorized access to the memory elements 31 on-board the card 3.

In one embodiment, the digital temperature sensor 11 is read at regular intervals by the electronic lock box CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lock box operating environment temperature. As noted above, a single chip can be used to replace the combination of crystal oscillator 15 and temperature sensor 11, such as a part number DS32KHZ manufactured by Dallas Semiconductor, generally designated by the reference numeral 37 on FIG. 3.

LED indicator lamps 19 and a piezo buzzer 20 are included to provide both an audible and a visual feedback of operational status of the electronic lock box 5. Their specific uses are described in detail in other patent documents by the same inventor, as noted below.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Description of Other System Components:

Referring now to FIG. 2, a fingerprint module generally designated by the reference numeral 95 includes a fingerprint sensor 90, a processing circuit 91, and a serial interface 92. The processing circuit 91 will typically be some type of microprocessor chip, or it could be an ASIC (Application Specific Integrated Circuit) that contains a processing device or a logic state machine. The serial interface 92 can be of many different types that are commercially available, including a wireless serial interface, if desired.

Figure 3:
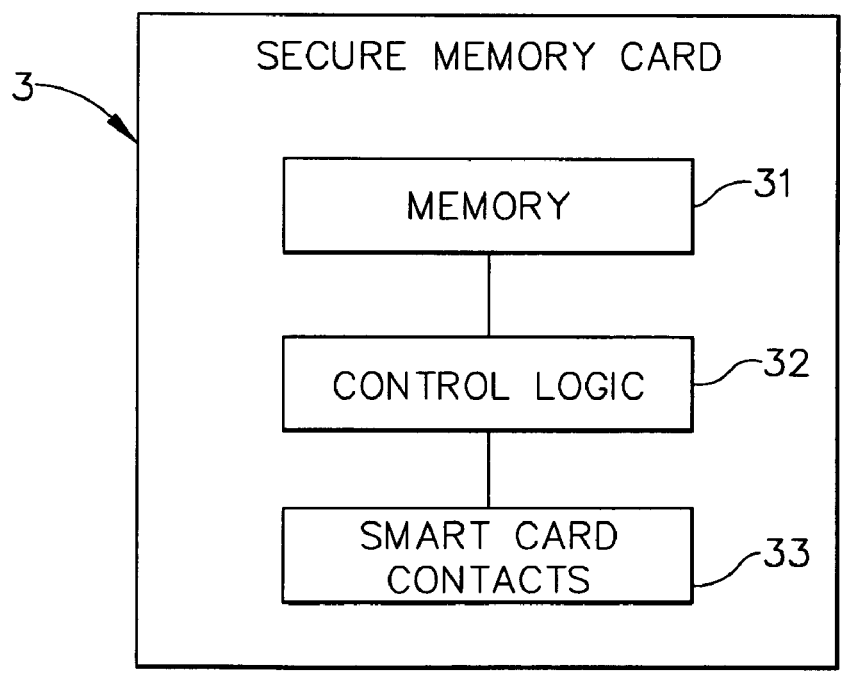
FIG. 3 is a schematic block diagram of a secure memory card used in the portable electronic lock box security system of FIG. 1.

Referring now to FIG. 3, a secure memory card 3 will contain multiple memory elements in its memory circuit 31, some control logic 32, and "smart card" contacts 33. As noted above, there are industry standard smart card devices available including some that also include an on-board computer or microprocessor circuit (not shown in FIG. 3). In general, the smart card contacts 33 will interface to a smart card connector 17 of the electronic lock box 5. Those same smart card contacts 33 would also be able to interface to a different computing device using a smart card reader that also connects to the smart card contacts through some kind of connector. Such a connector can be part of a portable computer such as a Model No. PAR2 that is manufactured by Spyrus Incorporated. Of course, other types of portable computers and smart card connectors could be substituted for the above-listed model and manufacturer of these devices.

A different type of portable computer 80 can also be a PDA, or "Portable Digital Assistant," that is commercially available in many forms at the present time. A cell phone could also work as a portable computer 80 in many respects, particularly if it was able to work as a wireless Internet communications device. As discussed below, these types of portable computers can be interfaced to a separate fingerprint module, or perhaps could contain an on-board integral fingerprint module.

Previously, biometric identification devices were too costly and unreliable to implement in environments where electronic lock boxes are used. Improvements in biometric technologies as well as the large scale production of self-contained biometric sensor modules have brought the cost and reliability requirements into the domain where it is possible to implement such technologies into electronic lock boxes.

The security weakness of PIN-based systems in real estate electronic lock boxes is well known. There have been numerous instances where users have written their PIN on their electronic keys or smart cards, only to have them stolen. Most of the conventional electronic lock box systems rely on an expiration of the electronic key, or data contained on a smart card to control the useful life of the access device. In the event an electronic key or a card is stolen, there could be a substantial amount of time where a thief could gain access to any property for sale in an area served by a board of REALTORs®. The addition of biometric security to the access device is a guarantee of high security in a system where the current types of PIN-based security makes the users themselves the weakest links in the entire system.

Conventional biometric enabled lock systems typically employ local enrollment of biometric information, or are connected to a computer network for processing and authorization of biometric data. Real Estate electronic lock boxes are self-contained lock systems that are spread over a significant geographic area, and therefore, usually it is impractical to enroll authorized users at every unit. Moreover, usually it also is impractical to network them due to the limited battery energies available. With improvements in battery technology, or by use of an alternative electrical energy gathering methodology (e.g., using solar panels with a small battery), it becomes more practical to store such biometric data on the electronic lock boxes themselves, and even to network them if that is the desired system for a particular user.

On the other hand, for many users, a more practical solution is to have the user carry in a secure way either the biometric data itself, or a device that is capable of exchanging biometric data with a central clearinghouse computer.

In one embodiment of the present invention, a "smart card" has a memory that contains the set of lock access information that is necessary to enable lock access, in addition to a numeric representation of the system user's biometric information. Only when the smart card is presented with the individual's corresponding "live" biometric data will access to the device's other functions be allowed. It should be noted that the stored biometric data and the "live" biometric data (the "observed" data that is gathered in real time) must statistically correlate with one another. This does not necessarily require an identical match between the two data sets, but a substantial match is desired before determining a positive authentication to the current access request; this would be considered a "sufficient correlation." Note that a "smart card" typically contains non-volatile memory, with at least some alterable memory elements; some smart cards also include a processing circuit and thus can perform calculations and logic functions. (See the description above for a typical smart card 3, in reference to FIG. 3.)

With regard to a "matching algorithm" used in the present invention, it is typical for a manufacturer of a biometric sensor to also provide software that performs the important function of comparing the observed biometric data to the previously-stored enrollment biometric data. Of course, if a system designer wishes to invent his or her own new algorithm, such new matching algorithm can be used in the present invention.

In the present invention, the matching algorithm can be resident at more than one location; for example, the matching algorithm could be in the electronic lock box, and both the observed and enrollment biometric data would then be provided to the electronic lock box, and the electronic lock box itself would perform the comparison and make the decision about authorizing or denying access, or performing other functions, such as releasing the shackle. Alternatively, the matching algorithm could be resident at the central clearinghouse computer, or be resident on a smart card that had processing capability, or be resident on a separate fingerprint module (or in an "integrated" fingerprint module). Furthermore, the matching algorithm could be resident on a separate portable computer, such as a PDA. On one hand the biometric measuring device could communicate with a standard (commercially-available) PDA that has the matching algorithm in its memory circuit; or on the other hand, a "special" PDA could be provided that not only performs the normal computing and communications functions of a commercially-available PDA, but also contains an integral biometric sensor, such as a fingerprint sensor.

In the embodiments where the matching algorithm is not resident on the electronic lock box, the external device with the matching algorithm can provide more than one form of result when it performs the comparison calculation. The result could be a mere "GO or NO-GO" answer, which would then be passed to the electronic lock box by a wireless communications device or by a smart card, for example.

Alternatively, the algorithm's result could be a statistical numeric value that provides an indication as to "how good" the match turned out to be. For example, the higher the statistical numeric value, the closer the match. In this embodiment, the statistical result itself could be transmitted to the electronic lock box (by a wireless communications device or by a smart card, for example), and then the processing circuit of the electronic lock box could make its own determination about authorizing or denying access to its secure compartment, or to another requested function. In this scenario, the electronic lock box's decision could have more than one threshold level for more than one level of security. For example, it may require a closer match (e.g., a higher statistical numeric result) when determining whether or not the present user is the actual owner of the electronic lock box (and who is attempting to perform a function that only the owner is permitted to perform), as compared to determining if the present user is a different person, such as a real estate agent who is attempting only to obtain access to the secure compartment.

In a wireless system (another embodiment), biometric data collected at the time of a lock access attempt is relayed, via wireless data transfer technology, to a clearinghouse computer 60 where correlation and authentication occurs. The "live" biometric data can be collected either by a portable computer device 80 or by the electronic lock box device 5 (see FIG. 1). Upon successful (sufficient) correlation, data is relayed back to the point of collection (i.e., where the "live" biometric data was taken) to signal whether authorization has succeeded or not.

In yet another embodiment of the present invention, a user carries an "electronic key," which is a portable computing device that transmits lock authorization information from the electronic key itself to an electronic lock box. The "live" biometric data is collected either on the electronic key, or on the electronic lock box, and then compared to the electronic key's stored "authorized user" biometric data, prior to authorization and transmission of lock authorization data to the lock. An example of a conventional electronic key is the d-Key™, sold by G.E.-Supra.

One advantage of the present invention is in its ability to retain flexibility in the various possible locations where the biometric sensors and the data storage devices can be placed around the system, to most cost effectively implement the system.

Other aspects of the electronic lock box of the present invention are more fully described in earlier patents and patent applications by the same inventor, including Ser. No. 10/172,316, filed on Jun. 14, 2002, titled "ELECTRONIC LOCK SYSTEM AND METHOD FOR ITS USE," now U.S. Pat. No. 7,009,489 B2; Ser. No. 10/267,174, filed on Oct. 9, 2002, titled "ELECTRONIC LOCK SYSTEM AND METHOD FOR ITS USE WITH CARD ONLY MODE," now U.S. Pat. No. 6,989,732 B2; Ser. No. 10/805,020, filed on Mar. 19, 2004, titled "ELECTRONIC LOCK BOX WITH SINGLE LINEAR ACTUATOR OPERATING TWO DIFFERENT LATCHING MECHANISMS," now U.S. Pat. No. 7,086,258 B2; Ser. No. 10/805,018, filed on Mar. 19, 2004, titled "ELECTRONIC LOCK BOX WITH MULTIPLE MODES AND SECURITY STATES;" and Ser. No. 11/193,932, filed on Jul. 29, 2005, titled "ELECTRONIC LOCK SYSTEM AND METHOD FOR ITS USE WITH A SECURE MEMORY CARD."

Further Description of Electronic Lock Box

In the present invention, the electronic lock box incorporates a software routine that is capable of comparing the biometric data retrieved from a secure memory storage or communications device, or from a central clearinghouse computer, with the data acquired from the biometric sensor. In one such embodiment, referring now to FIG. 1, the biometric sensor device 95 is connected to an electronic lock box processing circuit, CPU 16, for processing of biometric data. CPU 16 controls the processing and download of biometric data to the CPU's memory circuit. The biometric data is analyzed by software residing in the CPU memory system to create specific identification data that is unique for each correctly authorized user. This information is then compared by CPU 16 with previously-stored biometric identification information that has been stored on a secure memory card memory 31, to determine if the secure memory card 3 is being used by its authorized user. If there is a sufficient correlation between the observed (i.e., "live") biometric data and the biometric data stored in the memory 31 of secure memory card 3, access to certain electronic lock box functions will be granted.

Description of the Biometric Device

The biometric device used in an exemplary embodiment of the present invention is Atmel's AT77C101B FingerChip™. This device is ideally suited for this application as it uses thermal imaging instead of optical imaging (or capacitive imaging), thus simplifying system design. The device is also capable of operating in both upper and lower temperature extremes associated with an outdoor lock system device, and will tend to eliminate or at least minimize the moisture problems that would arise with a capacitive type sensor matrix. To operate the device, the user sweeps his or her finger over the sensor, which creates an electronic image of the fingerprint pattern, for download and processing by CPU 16.

It should be noted there are a number of other biometric devices and self-contained modules (such as Bionoply and ODI) available on the market, and new ones are appearing frequently. Thus any number of other types of sensing devices could be substituted without deviating from the spirit of this invention. It should also be noted that the biometric data processing used in the present invention may occur on standard microprocessor devices, or on an application specific integrated circuit (ASIC) that is specifically designed to improve recognition performance, prior to the biometric data being relayed to CPU 16, for example, for final authorization decisions.

The above-noted biometric sensing devices are all fingerprint sensors, which will generally work well in the present invention. However, other forms of biometric sensors will also work in the present invention, including retinal scanners and voice print sensors. For example, Nuance Communications, Inc. of Burlington, Mass. sells a voice print analysis software package, which uses a microphone to obtain the "live" biosensor data. In this patent document, the term "biometric sensor" includes all types of sensing devices that measure some parameter that is personal (i.e., unique) to a particular human being, and even a DNA scanner could be used if such a scanner is later designed that would be essentially non-intrusive to the human body, and also commercially affordable.

An important feature of any biometric sensor used in the present invention is the ability for all like sensors to generate substantially the same pattern that will be capable of recognition with a high degree of certainty across devices of the same type and manufacturer, in a wide variety of operating climates. At this time the voice print and fingerprint sensors seem to be the most readily available and reliable biometric sensors, but certainly other biometric sensors will be developed in the future that will be capable of sampling other types of biometric data in a reliable and affordable manner.

Description of Operation

In all electronic lock box access operating modes described in the earlier or co-pending patent applications (noted above) by the same inventor, the step of entering the user's identification number (or PIN) on the electronic lock box keypad 14 is replaced, in the present invention, with a step in which a user activates a biometric identification or sensing device. For example, the electronic lock box CPU 16 compares the observed (the "live") biometric data with the retrieved biometric enrollment data that is resident on the secure memory card, or that is transmitted through an intermediary device from a central clearinghouse computer (when the enrollment data has been previously stored at the central clearinghouse computer). This new process step replaces the earlier-described step of comparing the user's keypad-entered identification information. Processing continues as expected upon either a corresponding match, or failure to match, with the appropriate identification information.

In the situation where data is transmitted through an intermediary device such as a cell phone or a PDA, transmission of the biometric data can occur with any of the well known technologies, such as infrared and RF (radio frequency).

The biometric data contained in the secure memory card or at a central clearinghouse computer is obtained through an enrollment process that occurs when the secure memory device is issued to the individual being granted access. Typically the biometric data is compressed and processed by a variety of commercial and vendor proprietary algorithms to reduce the amount of information to a relevant subset of usable data. Ideally this data will be encrypted prior to storage or transmission. It is also advantageous to store multiple enrollments in fingerprints, for example. This allows redundant methods of authorization attempts in the event of a failure to match.

In one exemplary mode of the invention, enrollment occurs using a computer "stand" that is equipped with a biometric sensor that is connected to a personal computer. In another mode of the invention, enrollment could occur directly through an electronic lock box using software that is capable of recognizing a need for enrolling a user who is interfacing with that electronic lock box.

Regardless of the type of sensor used or method of transmission, the resulting comparison of enrolled data to current biometric data presented at the electronic lock box is used to grant or deny access to the secure functions of the electronic lock box.

In the situation where data is transmitted through an intermediary device such as a cell phone or PDA, transmission of the biometric data can occur with any of the well known technologies, such as infrared and RF (radio frequency). An "electronic key" could contain the biometric sensor, and whereupon receiving the biometric data, the electronic key could subsequently send the data to a central clearinghouse computer for processing and verification. Upon verification, the central clearinghouse computer could send back authorization data to the electronic key, thus enabling it to perform certain operations; or the authorization data could be relayed through the electronic key to the electronic lock box, thereby allowing the electronic lock box to perform an authorizing function. One advantage of this methodology is having a central repository where all biometric data can reside (i.e., the clearinghouse computer). This facilitates easier updating of authorization data, as well as the ability to instantly "de-authorize" an individual, when necessary or desired.

For systems where a link to a central clearinghouse computer is not possible or practical, the electronic key could itself contain the biometric data of the authorized users. Such an electronic key could require users to authorize themselves prior to enabling certain aspects of key's functionality. In addition, the users would have to be "enrolled" at that electronic key, or at the electronic lock box of interest.

In other situations, the location of the physical biometric sensor could be placed on a secure memory card. This would reduce the overall system cost, because the number of users is typically much smaller than the number of lock devices, and this arrangement would eliminate a significant percentage of cost of the biometric sensors themselves. It would also aid in situations where a more cost effective sensor could be used, due to the much less rigorous environmental factors that would come into play with a sensor carried on a secure memory card that remains with the user, instead of being left outdoors (at the electronic lock box) for significant periods of time. Moreover, the location of the physical biometric sensor could be placed on a portable computer (such as a PDA, or wireless Internet cell phone).

Figure 5:
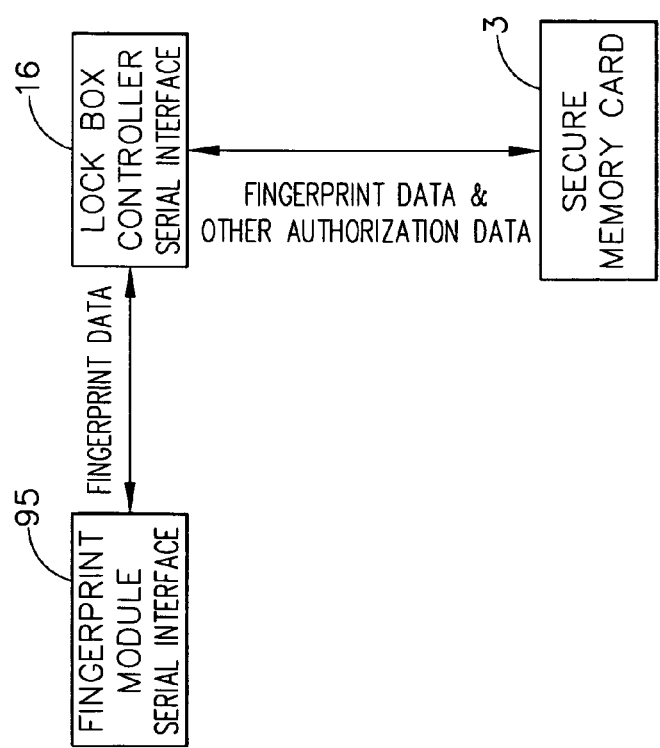
FIG. 5 is a diagrammatic view of a portion of the portable electronic lock box security system of FIG. 1, in which a separate fingerprint sensing module is in communication with the controller of an electronic lock box, and a separate secure memory device provides fingerprint enrollment data to the electronic lock box, or the electronic lock box provides the observed fingerprint data to the secure memory device. (Note that, if the electronic lock box can communicate with the central clearinghouse computer, then the central database could store the fingerprint enrollment data, and the clearinghouse computer could make authorization decisions.)

In the system illustrated in FIG. 5, the fingerprint module 95 is a separate independent device, and has a serial interface that exchanges data with an electronic lock box controller, which generally is the CPU 16 of an electronic lock box 5. In this system, a secure memory card 3 also interfaces to the electronic lock box controller 16 of the electronic lock box 5. The enrolled fingerprint data for a particular authorized user has been stored in the memory elements 31 of the secure memory card 3, and the "live" biometric fingerprint data is taken in real time by the fingerprint module 95. Both sets of biometric (fingerprint) data are sent to the electronic lock box controller 16, where these two sets of data are compared. Alternately, the enrolled fingerprint data is stored in the clearinghouse computer's central database 62, and a portable computer could be used to obtain authorization by sending the live (observed) biometric data to the clearinghouse computer, for analysis. This type of system is also discussed below, in reference to other drawings and configurations of the present invention.

In this mode of the present invention, the electronic lock box controller 16 can operate in more than one security mode. As discussed above, the enrollment data stored in the secure memory card 3 can be represented as a numeric value, and the live (or "observed") fingerprint data can also be represented by a numeric value. The "closeness" of these two numeric values can determine how reliable the live fingerprint data result is with respect to the enrolled fingerprint data, for example. For a higher security function that has been requested by a user, the "match" between the numeric values would need to be closer. The thresholds for how close such a match must be in numeric values can be determined by the user, and this threshold value could also be settable for a particular REALTOR Board, if desired.

Figure 6:
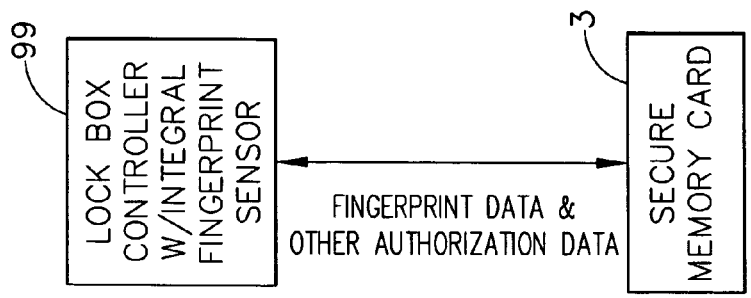
FIG. 6 is a diagrammatic view of a portion of the portable electronic lock box security system of FIG. 1, in which a fingerprint sensing module is integrated into an electronic lock box, and a separate secure memory device provides fingerprint enrollment data to the electronic lock box, or the electronic lock box provides the observed fingerprint data to the secure memory device. (Note that, if the electronic lock box can communicate with the central clearinghouse computer, then the central database could store the fingerprint enrollment data, and the clearinghouse computer could make authorization decisions.)

Referring now to the system described in FIG. 6, again a secure memory card 3 contains enrolled biometric data, such as fingerprint data, for a user of that particular secure memory card. FIG. 6 is similar to the system of FIG. 5, except the fingerprint sensor 99 is now an integral device that is contained in the electronic lock box 5 and essentially is permanently interfaced to the controller circuit 16 of the electronic lock box 5. The system of FIG. 6 would work the same as the system of FIG. 5, with respect to determining a close match between enrolled biometric data and the live biometric data.

Figure 7:
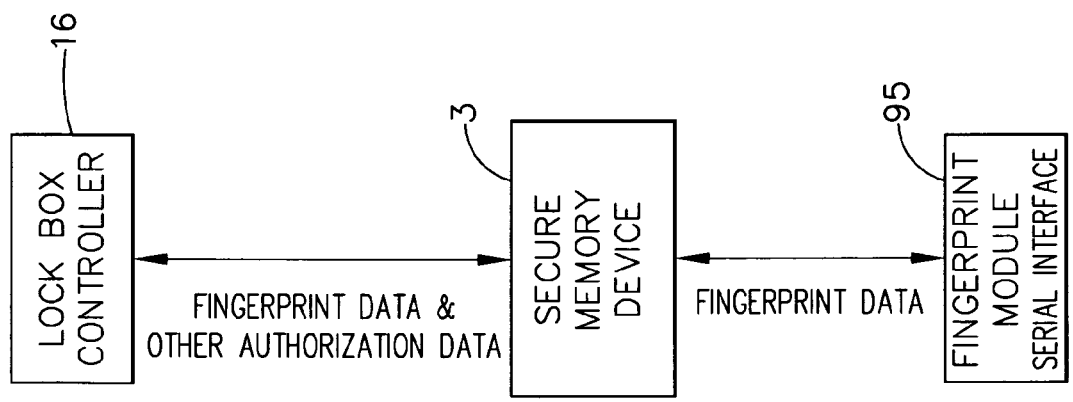
FIG. 7 is a diagrammatic view of a portion of the portable electronic lock box security system of FIG. 1, in which a separate fingerprint sensing module is in communication with a separate secure memory device, and the controller of an electronic lock box is in communication with the secure memory device, in which the secure memory device provides both fingerprint enrollment data and the observed fingerprint data to the electronic lock box, or the secure memory device contains a processing unit that performs a comparison between previously stored fingerprint enrollment data and the observed fingerprint data received from the fingerprint sensing module. (Note that, if the electronic lock box can communicate with the central clearinghouse computer, then the central database could store the fingerprint enrollment data, and the clearinghouse computer could make authorization decisions.)

In the system illustrated in FIG. 7, an electronic lock box controller 16 interfaces with a secure memory device 3, which in turn interfaces with an independent fingerprint module 95. The fingerprint data that is gathered "live" is thereby transmitted to the secure memory module 3 and stored at least temporarily in the memory elements 31 of the secure memory card 3. In this system, the enrollment biometric data can have already been stored either in the electronic lock box memory circuit 21 of the electronic lock box 5, or the enrollment biometric data could have been previously stored in other portions of the memory elements 31 of the secure memory device 3. In either situation, the CPU/electronic lock box controller 16 of the electronic lock box 5 can be used to determine whether or not a "match" exists between the stored enrollment biometric data and the live biometric data. As described above, the authorization can be in stages of numeric matching, and for various security levels. For example, if the electronic lock box owner is attempting to perform a highly secure function, the closeness of the match between the live biometric data and the enrollment biometric data can be required to be more narrow, in which the numeric values of the live biometric data and the enrollment biometric data need to be at a closer predetermined difference value, for example. Many variations on this theme are possible without departing from the principles of the present invention, and the required "closeness" of a match can be expressed in percentages, or other types of numeric values, as per the designer's choice.

Figure 8:
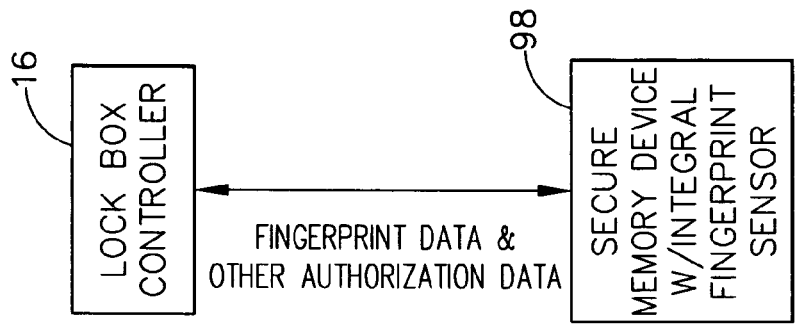
FIG. 8 is a diagrammatic view of a portion of the portable electronic lock box security system of FIG. 1, in which a fingerprint sensing module is integrated into a separate secure memory device, and the controller of an electronic lock box is in communication with the secure memory device, in which the secure memory device provides both fingerprint enrollment data and the observed fingerprint data to the electronic lock box, or the secure memory device contains a processing unit that performs a comparison between previously stored fingerprint enrollment data and the observed fingerprint data received from its integral fingerprint sensing module. (Note that, if the electronic lock box can communicate with the central clearinghouse computer, then the central database could store the fingerprint enrollment data, and the clearinghouse computer could make authorization decisions.)

The system of FIG. 8 is similar to that of FIG. 7, in which the electronic lock box controller 16 again is in communication with a secure memory device. However, in FIG. 8, the secure memory device has an integral fingerprint sensor, and this overall structure is generally designated by the reference numeral 98. In this system, the live (observed) biometric data is immediately available to the memory circuit 31 of the secure memory card 96, and can be transmitted to the electronic lock box controller 16. The enrollment data can have either been previously stored in the memory circuit 21 of the electronic lock box 5, or it could have been previously stored in other memory elements of the secure memory card 3. In either situation, the electronic lock box controller 16 can determine the closeness of the match, as required depending upon the various security requirements for different functions that might be requested by a user, or by the electronic lock box owner. These types of options are similar to those discussed above.

Figure 12:
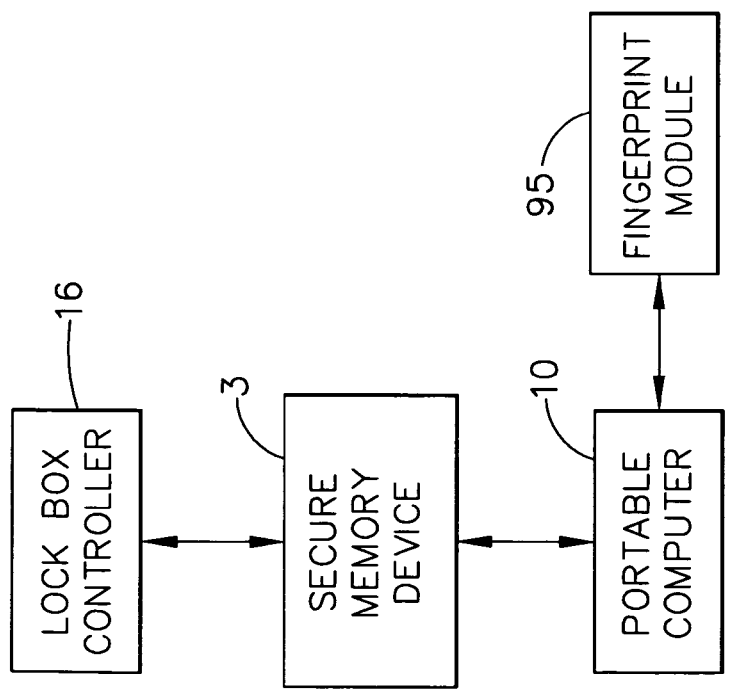
FIG. 12 is a diagrammatic view of a portion of the portable electronic lock box security system of FIG. 1, in which a separate fingerprint sensing module is in communication with a portable computer, which in turn is in communication with a separate secure memory device, and the controller of an electronic lock box is also in communication with the separate secure memory device; the fingerprint module provides the observed fingerprint data to the portable computer; the secure memory device can provides fingerprint enrollment data to the electronic lock box, or to the portable computer; and either the electronic lock box controller or the portable computer can make authorization decisions in this system. (Note that, if either the electronic lock box or the portable computer can communicate with the central clearinghouse computer, then the central database could store the fingerprint enrollment data, and the clearinghouse computer could make authorization decisions.)

Referring now to FIG. 12, an electronic lock box controller 16 is in communication with a secure memory device 3, which in turn is in communication with a portable computer 10. In FIG. 12, an independent fingerprint module 95 is interfaced to the portable computer 10, rather than to an electronic lock box controller or to a secure memory device. In this system of FIG. 12, the portable computer 10 will receive the "live" (observed) biometric data from the fingerprint module 95. The enrollment biometric data could have been previously stored on any of three different components in this system of FIG. 12: the memory circuit 21 of the electronic lock box 5, the memory elements 31 of the secure memory device 3, or the memory circuit of the portable computer 10. In addition, the authorization processing can be performed by either the electronic lock box controller 16 or by the processing circuit of the portable computer 10, depending upon the designer's choice for this system of FIG. 12.

The live (observed) biometric data will first exist at the portable computer 10, but that live biometric data could be passed to the secure memory device 3, and then to the electronic lock box controller 16, and the controller circuit 16 could make the authorization decisions. Alternatively, the portable computer 10 will have a processing circuit that can review the live biometric data from the fingerprint module 95, and compare it to enrollment data that was either stored on-board the portable computer's memory circuit, or was previously stored in the memory elements of the secure memory device 3 or the electronic lock box 5, and then passed over to the portable computer 10 for processing.

It may be decided by the system designer that the "most secure" system would have the electronic lock box controller making the authorization decisions. However, the portable computer 10 could be quite advanced, since PDA's and wireless Internet-type cell phones are continually advancing in processing power and memory capabilities, and so the system designer may determine that the portable computer 10 is the "best" device for making authorization decisions. In that situation, the portable computer 10 could pass a "GO-NO-GO" decision to the electronic lock box controller 16, or the portable computer 10 could pass numeric values that represent the live biometric data and the enrolled biometric data, and let the electronic lock box controller 16 make the final decision as to whether or not a requested function should or should not be authorized, based on the numeric representations (values) of the live and enrollment biometric data. All of these possibilities are contemplated in the present invention. As noted above, as an alternative the enrolled fingerprint data could be stored in the clearinghouse computer's central database 62, and a portable computer could be used to obtain authorization by sending the live (observed) biometric data to the clearinghouse computer, for analysis.

Figure 13:
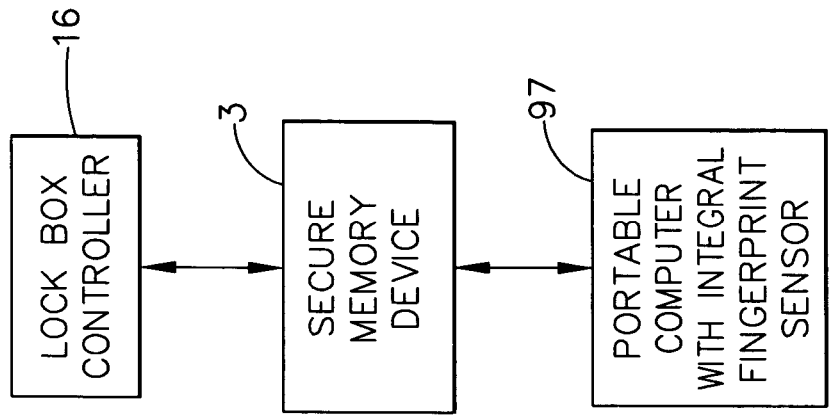
FIG. 13 is a diagrammatic view of a portion of the portable electronic lock box security system of FIG. 1, in which a fingerprint sensing module is integrated into a portable computer, which is in communication with a separate secure memory device, and the controller of an electronic lock box is also in communication with the separate secure memory device; the fingerprint module/portable computer combination provides the observed fingerprint data; the secure memory device can provides fingerprint enrollment data to the electronic lock box, or to the portable computer; and either the electronic lock box controller or the portable computer can make authorization decisions in this system. (Note that, if either the electronic lock box or the portable computer can communicate with the central clearinghouse computer, then the central database could store the fingerprint enrollment data, and the clearinghouse computer could make authorization decisions.)

Referring now to FIG. 13, the electronic lock box controller 16 communicates to the secure memory device 3, which also communicates with a portable computer. In FIG. 13, the fingerprint sensor is now an integral device with the portable computer, and this combination device is generally designated by the reference numeral 97. The system of FIG. 13 would operate essentially the same as that of FIG. 12, except that the live (observed) biometric data would be immediately available to the portable computer's processing circuit of the combination device 97, rather than having to receive the live biometric data via some type of data link (as in the system of FIG. 12). For this system of FIG. 13, the various options as to where the enrollment biometric data should be stored and which processing device should make the authorization decisions would essentially be the same as that in FIG. 12, discussed above.

Figure 14:
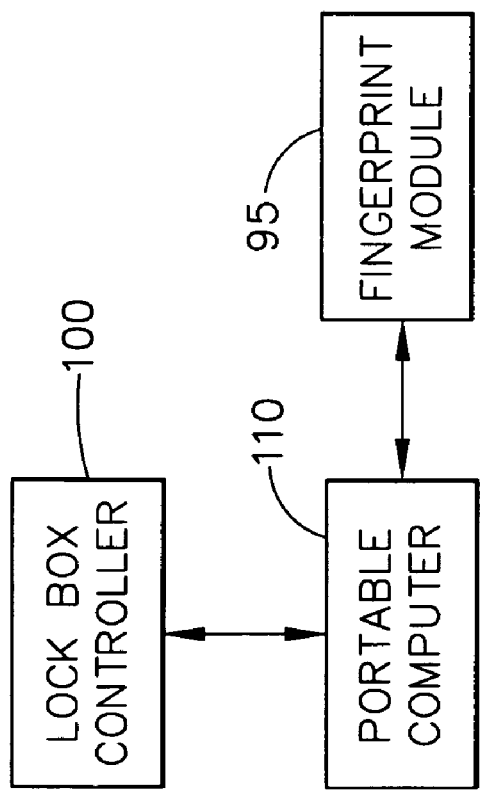
FIG. 14 is a diagrammatic view of a portion of the portable electronic lock box security system of FIG. 1, in which a separate fingerprint sensing module is in communication with a portable computer, which in turn is in communication with the controller of an electronic lock box; the fingerprint module provides the observed fingerprint data to the portable computer; either the electronic lock box or the portable computer can be the repository of the fingerprint enrollment data; and either the electronic lock box controller or the portable computer can make authorization decisions in this system. (Note that, if either the electronic lock box or the portable computer can communicate with the central clearinghouse computer, then the central database could store the fingerprint enrollment data, and the clearinghouse computer could make authorization decisions.)

In yet another alternative embodiment, FIG. 14 depicts an electronic lock box system in which an electronic lock box controller circuit 100 of an electronic lock box device is in communication with a portable computer 110 that could be an "electronic key," or it could be a standard personal digital assistant (PDA) that communicates directly through some type of communications link to the electronic lock box controller circuit 100. If a PDA is used, this communications link could be a standard infrared (IR) data link between the portable computer 110 and the electronic lock box 5 which contains the electronic lock box controller 100. In the system of FIG. 14, there would be no secure memory device 3 at all, and that level of security would be removed. This, of course, is an option that would be determined by the system designer.

In FIG. 14, an independent fingerprint module 95 is used to generate the "live" (observed) biometric data, and this live data is then transmitted to the portable computer 110 through some type of communications link. The portable computer 110 can have previously stored enrollment biometric data for this particular user, or that data could be previously stored in the memory circuit 21 of the electronic lock box 5, if desired by the system designer. Of course, the present invention would work correctly in either situation, as this is a matter of design choice.

In addition to the location of where the enrollment data has been stored, the decision as to which processing device will make the authorization determination is also a matter of design choice, which will be determined by the system designer. The electronic lock box controller 100 typically would have sufficient processing power, as well as the processing circuit of the portable computer 110, particularly for a modern device such as a PDA or a cell phone that is capable of using wireless Internet technology. If the portable computer 110 makes the authorization decision, that decision can be transmitted to the electronic lock box controller 100 as a "GO-NO-GO" decision, if desired, or the live biometric data and the enrollment biometric data could both be converted into numeric values, and those numeric values could be transmitted to the electronic lock box controller 100, where a "final" authorization decision can be made. This "final" authorization decision could have various security levels, depending upon the type of function being requested by the human user. As described above, if the user is attempting a function that should only be authorized if the user happens to be the "owner" of this particular electronic lock box 5, then that security level could be heightened, and then would require a closer match in the numeric values between the enrollment biometric data and the live biometric data. All of these possible variations are contemplated by the inventor.

As noted above, as an alternative the enrolled fingerprint data could be stored in the clearinghouse computer's central database 62, and the portable computer could be used to obtain authorization by sending the live (observed) biometric data to the clearinghouse computer, for analysis.

Figure 15:
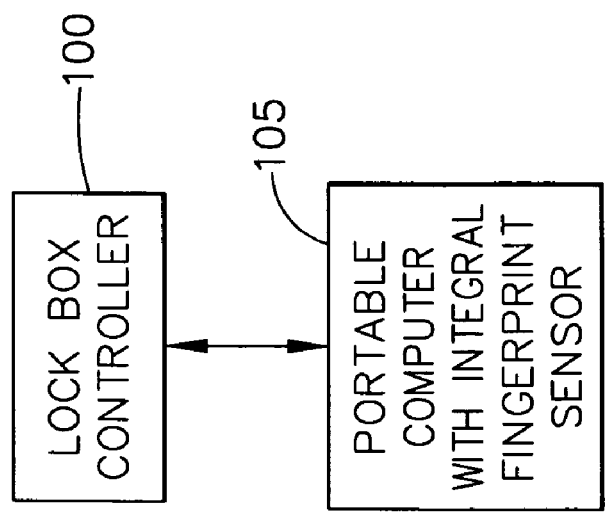
FIG. 15 is a diagrammatic view of a portion of the portable electronic lock box security system of FIG. 1, in which a fingerprint sensing module is integrated into a portable computer, which is in communication with the controller of an electronic lock box; the fingerprint module/portable computer combination provides the observed fingerprint data; either the electronic lock box or the portable computer can be the repository of the fingerprint enrollment data; and either the electronic lock box controller or the portable computer can make authorization decisions in this system. (Note that, if either the electronic lock box or the portable computer can communicate with the central clearinghouse computer, then the central database could store the fingerprint enrollment data, and the clearinghouse computer could make authorization decisions.)

Referring now to FIG. 15, the same electronic lock box controller 100 is used as was found in FIG. 14, and this device communicates to a portable computer. In FIG. 15, the portable computer is now provided with an integral fingerprint sensor, and this combination device is generally designated by the reference numeral 105. In FIG. 15, the portable computer/fingerprint sensor 105 can have the capability of a standard PDA or wireless Internet cell phone, and it can be constructed as a true "electronic key" that is able to command the electronic lock box controller 100 to perform various functions. The live (observed) biometric data could then immediately be available to the processing circuit of the combination portable computer device 105, and the enrollment biometric data also could have been stored there previously, depending on the designer's choice for this type of system. Alternatively, the enrollment biometric data could have been previously stored in the memory circuit 21 of the electronic lock box 5. As in FIG. 14, either the electronic lock box controller 100 or the processing circuit of the portable computer/combination sensor 105 could be used to make the authorization decisions, using various levels of security, if desired. Essentially, the systems of FIG. 14 and FIG. 15 can be designed to work in essentially the same operational modes. Again, as an alternative the enrolled fingerprint data could be stored in the clearinghouse computer's central database 62, and a portable computer could be used to obtain authorization by sending the live (observed) biometric data to the clearinghouse computer, for analysis.

Figure 9:
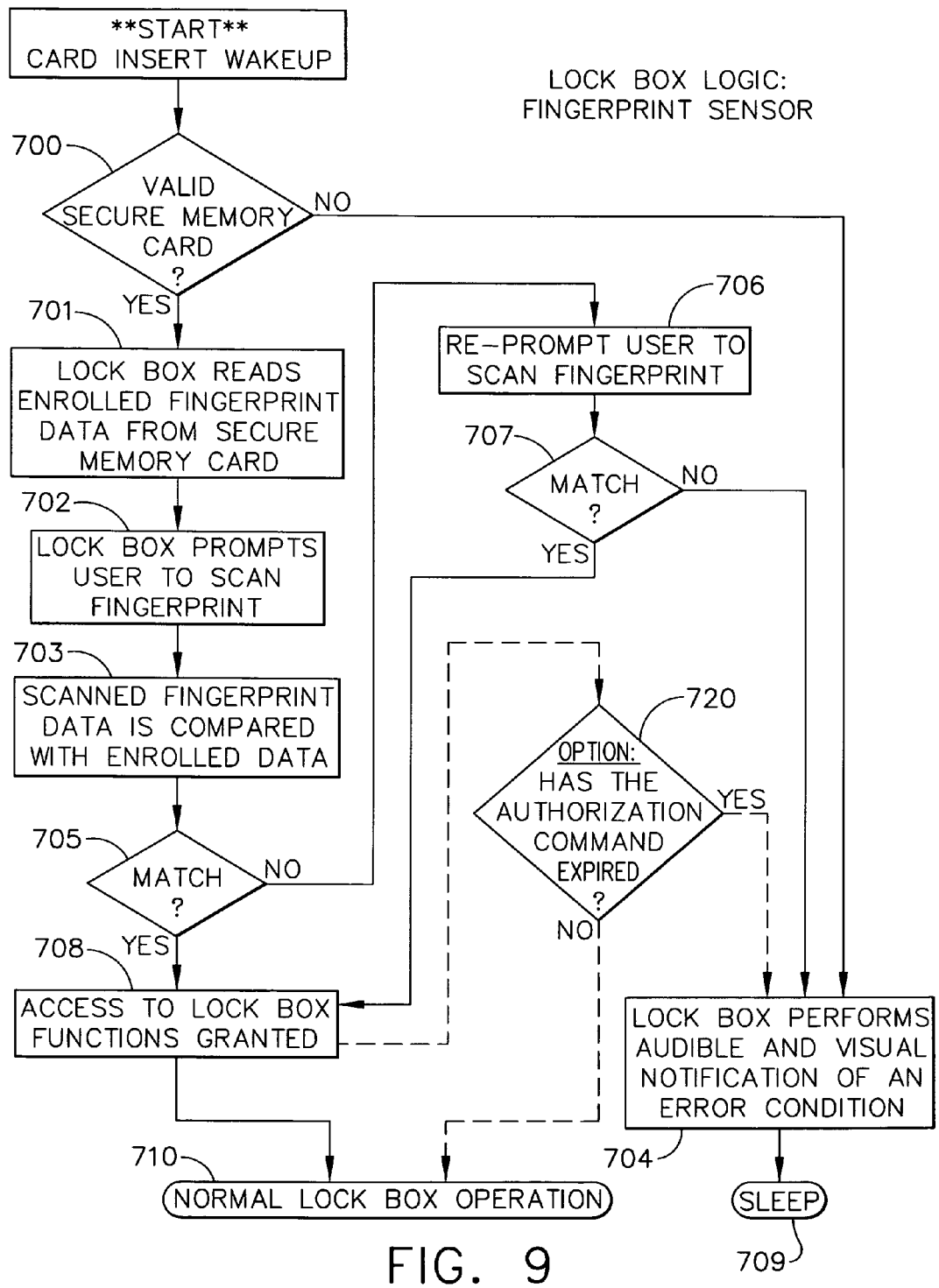
FIG. 9 is a flow chart showing some of the important logical operations performed by the electronic lock box of FIG. 1, when a user attempts to access the secure compartment using a secure memory card with stored fingerprint enrollment data, and the electronic lock box receives observed fingerprint data so as to make a determination whether to allow access or not.

Referring now to FIG. 9, a flow chart is provided in which a subroutine starts executing upon the insertion of a smart card into the electronic lock box card reader port. A decision step 700 now determines whether or not the secure memory card is a valid card. If the result is NO, the logic flow is directed to a box 704 in which the electronic lock box performs an audible and visual notification of an existing error condition. The electronic lock box then re-enters a "sleep" mode at a step 709.

If the secure memory card was a valid card at step 700, then the logic flow is directed to a step 701 in which the electronic lock box reads the enrolled fingerprint data that has been previously stored on the secure memory card. A step 702 now uses a function by which the electronic lock box prompts the user to scan his or her fingerprint. A step 703 now receives the scanned (observed) fingerprint data from the biometric sensor and compares that scanned or "live" fingerprint data with the enrolled fingerprint data. A decision step 705 now determines whether or not a sufficient match has occurred.

If the match as step 705 is not sufficient, then the logic flow is directed to a step 706 that re-prompts the user to scan his or her fingerprint again. A decision step 707 then determines whether or not a sufficient match has occurred this time, and if the result is NO again, the logic flow is directed to step 704 in which the electronic lock box performs an audible and visual notification of an existing error condition. The logic flow is then directed to the sleep state at step 709, and the electronic lock box processing circuit temporarily goes back to sleep.

If the match was sufficient at decision step 705, then access to appropriate electronic lock box functions is granted at a step 708. This step 708 is also reached if a sufficient match has occurred at the decision step 707. In either situation, once the electronic lock box functions have determined that access is to be granted, the logic flow is directed to a step 710 at which "normal" electronic lock box operation is allowed to continue. This ends the subroutine for entering biometric (fingerprint) data at an electronic lock box used in the present invention. It should be noted that this flow chart of FIG. 9 can essentially be used for several of the various systems that have been described in the drawings and in the written description hereof. The logic flow of FIG. 9 will work directly with the systems of FIGS. 5, 6, 7, and 8, in which the enrollment fingerprint data would typically be stored on the secure memory card. It could also work with the systems of FIGS. 12 and 13, in which the enrollment fingerprint data could be stored on the secure memory device 3, or as an alternative it could be stored on one of the other computing devices in those figures, including the central clearinghouse computer.

In the above description, the type of biometric data was often referred to as "fingerprint" data. This is merely for the purposes of describing one embodiment of the present invention, and it will be understood that all references herein to fingerprint data will have the meaning of any type of biometric data, of course including fingerprints.

Figure 10:
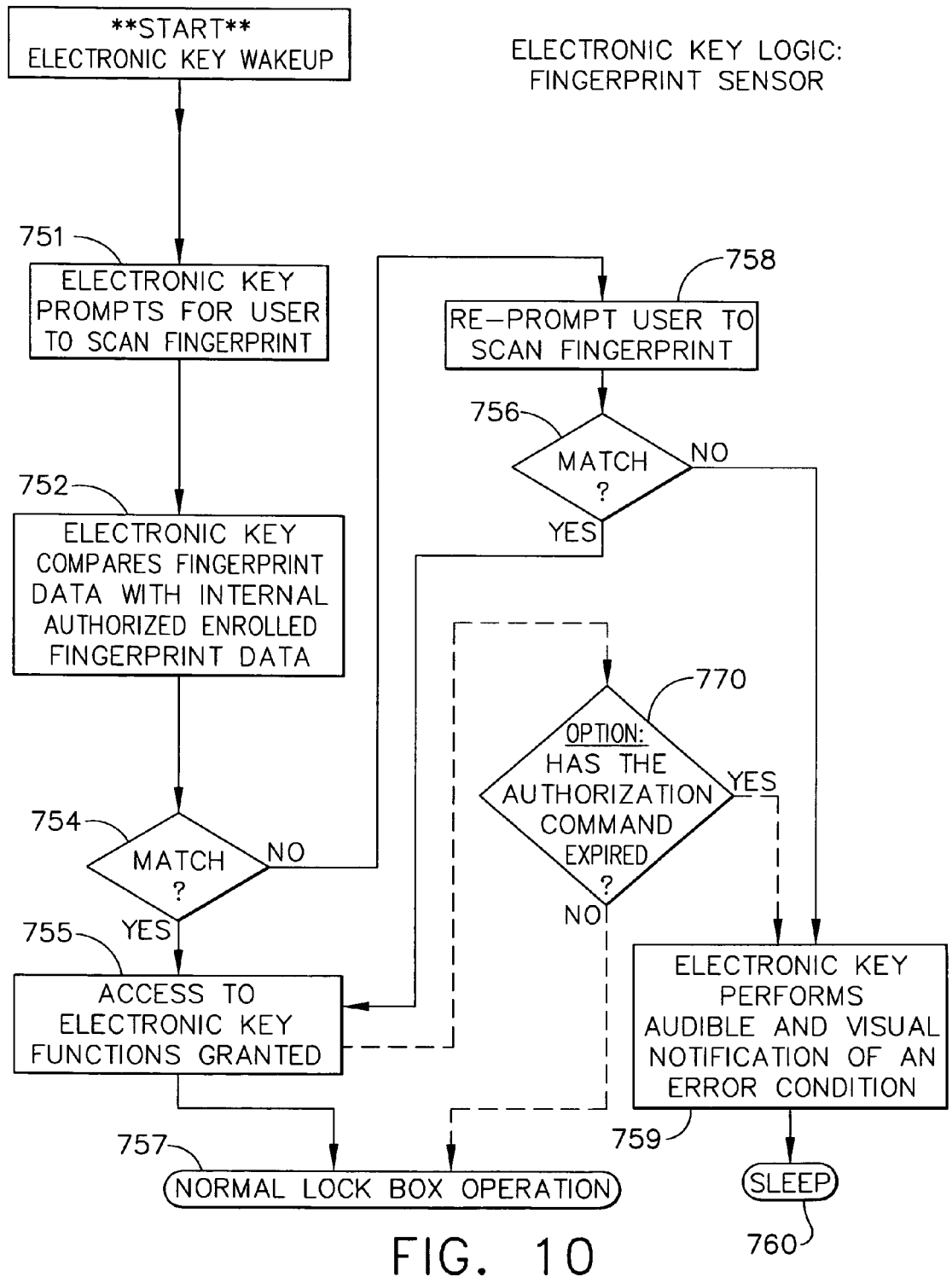
FIG. 10 is a flow chart showing some of the important logical operations performed by an electronic key when it is used by a user to obtain access to the secure compartment of the electronic lock box of FIG. 1, in which the electronic key contains stored fingerprint enrollment data, and the electronic key receives observed fingerprint data so as to make a determination whether to allow access or not, then tells the electronic lock box if access is to be granted.

Referring now to FIG. 10, an electronic key could be used to store the enrollment fingerprint data. In FIG. 10, the logic flow begins when the electronic key is awakened by some act, such as pressing a keypad button on the electronic key, or by depressing an ON-switch, if that electronic key includes such a switch. At a first step at 751, the electronic key prompts the user to scan for the user's fingerprint. At the next step 752, the electronic key compares the "live" fingerprint data with the enrolled fingerprint data that was previously placed into the electronic key's memory. It will be understood that the enrolled fingerprint data would be "authorized" data, and it has previously been stored in a memory cell that is internal to the electronic key device in this embodiment of the invention.

A decision step 754 now determines whether or not the live (observed) fingerprint data matches the enrollment fingerprint data. If not, the logic flow travels to a step 758 that re-prompts the user to scan for his or her fingerprint. A decision step 756 now determines whether this re-scanned (observed) fingerprint data matches the enrollment fingerprint data. If not, a step 759 requires the electronic key to perform an audible and visual notification of an existing error condition, and the electronic key goes back to sleep state at a step 760.

On the other hand, if a match occurred at decision step 754, or at decision step 756, then a step 755 grants access to appropriate functions in the electronic key. After that has occurred, a step 757 occurs in which "normal" electronic lock box operation is now allowed to take place, for the appropriate (now authorized) functions.

The flow chart of FIG. 10 can operate with more than one of the various systems described herein, including the systems described in FIGS. 12, 13, 14, and 15, which all have some type of portable computer. Although FIGS. 12 and 13 could allow the enrollment fingerprint data to be stored in the secure memory device 3, in these systems it is also possible to store the enrollment fingerprint data in the portable computer 10 of FIG. 12 or the combination portable computer 97 of FIG. 13. In FIGS. 14 and 15, there is no secure memory card, so the enrollment fingerprint data must be stored in either the portable computer 110 or the electronic lock box controller 100 of FIG. 14, or the enrollment fingerprint data must be stored in the electronic lock box controller 100 or the combination portable computer 105 of FIG. 15. Or, as a possible alternative the enrolled fingerprint data could be stored in the clearinghouse computer's central database 62, and a portable computer could be used to obtain authorization by sending the live (observed) biometric data to the clearinghouse computer, for analysis.

Figure 11:
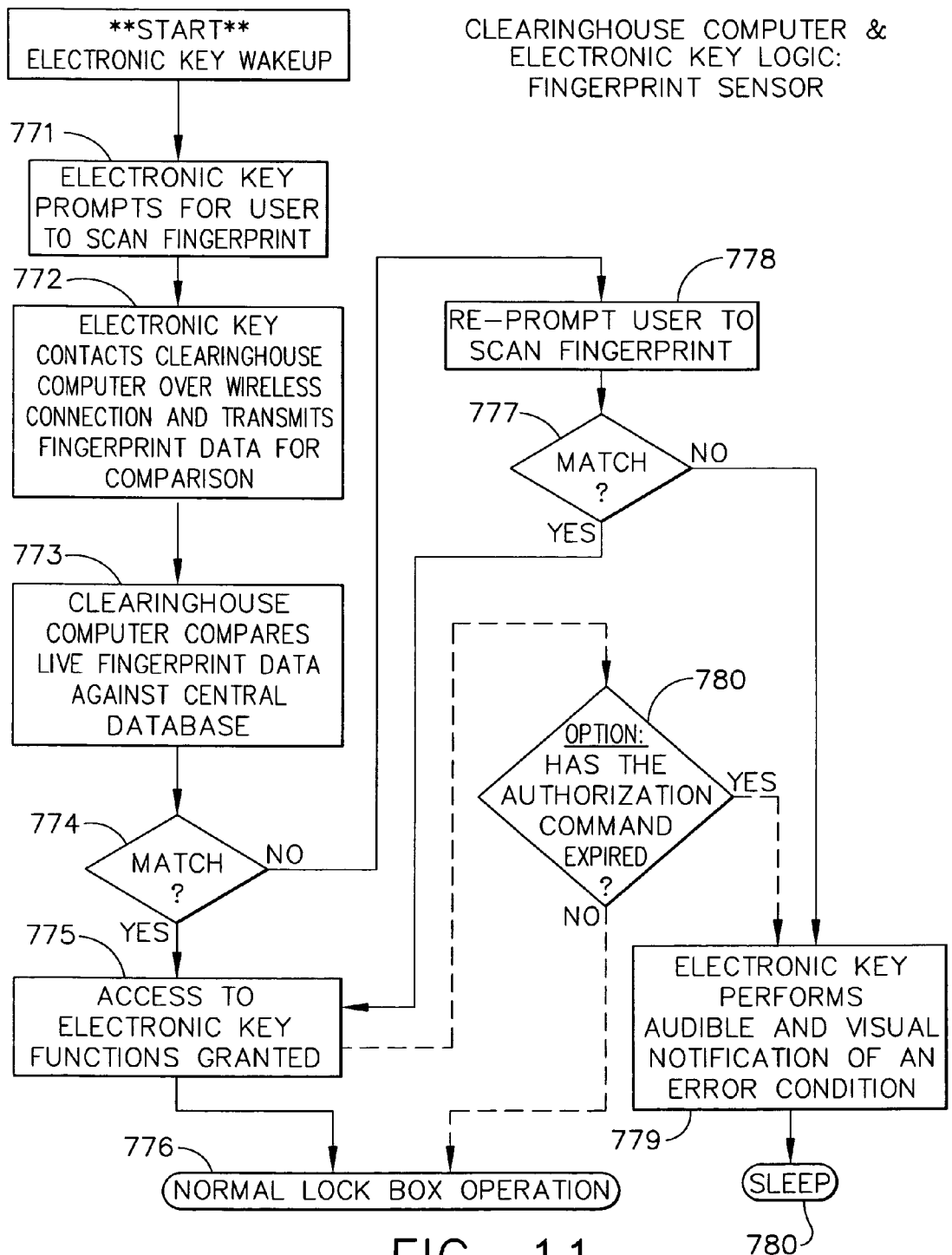
FIG. 11 is a flow chart showing some of the important logical operations performed by an electronic key when it is used by a user to obtain access to the secure compartment of the electronic lock box of FIG. 1, in which the electronic key receives observed fingerprint data, the electronic key contacts a central clearinghouse computer and transmits the observed fingerprint data to the central clearinghouse computer, the central clearinghouse computer compares the observed fingerprint data to previously stored fingerprint enrollment data so as to make a determination whether to allow access or not, and if a match is found the central clearinghouse computer informs the electronic key of this decision, and then the electronic key tells the electronic lock box if access is to be granted.

Referring now to the flow chart of FIG. 11, the various systems of the present invention that use an electronic key may have the capability for contacting a central clearinghouse computer to allow the central clearinghouse computer to make a determination of whether the "live" (observed) fingerprint data that has been gathered sufficiently matches the stored enrollment fingerprint data. The flow chart begins by having the electronic key woken up due to an act such as striking a key on its keypad, or by depressing an ON-switch, if the electronic key has such a switch. Once the key has been awakened, a step 771 prompts the user (via an audio or a visual message) to scan for his or her fingerprint. At a step 772, the electronic key contacts the clearinghouse computer over a wireless connection, and the electronic key transmits the observed or "live" fingerprint data to the clearinghouse computer. After the clearinghouse computer receives this observed fingerprint data, at a step 773 the clearinghouse computer compares the enrolled (assumed to be the authorized) fingerprint data that is stored in its central database to the observed (live) fingerprint data that has been transmitted from the electronic key. A decision step 774 now determines whether or not a sufficient match has occurred.

If a match has not occurred at decision step 774, then a step 778 re-prompts the user to scan for his or her fingerprint data once again. A decision step 777 now determines whether or not a sufficient match occurs at this stage. If not, a step 779 causes the electronic key to perform an audible and visual notification of an existing error condition, and the electronic key goes back to a sleep state at a step 780.

On the other hand, if a sufficient match has occurred at either decision step 774 or 777, then a step 775 allows access to the appropriate functions that have been requested of the electronic key. This could occur by use of a message sent from the clearinghouse computer to the electronic key, transmitted wirelessly in a preferred mode of the invention. Once the appropriate functions have been granted, a step 776 allows normal electronic lock box operation to continue.

The flow chart of FIG. 11 can occur in several of the various systems described above, including the systems of FIGS. 12, 13, 14, and 15, which each have a portable computer. Assuming these portable computers are capable of transmission back to the central clearinghouse computer 60, then a real time data exchange can occur by which fingerprint data that is "live" can be sampled by a fingerprint sensor or fingerprint module, and that observed (live) fingerprint data can be transmitted back to the clearinghouse computer in real time. Since the clearinghouse computer 60 has a central database 62, its processing system 61 will be able to compare the observed fingerprint data to the previously enrolled fingerprint data that is stored in database 62. If a high security match is required, then the observed fingerprint data can be converted to a numeric data value, and that numeric data value can be compared to a similar numeric data value stored in database 62, and if the match is sufficiently close, then the "more secure" requested function can be authorized in the proper circumstances. In other words, if a sufficiently close match is found between the observed and enrolled biometric data values, for various levels of security, then an appropriate function will be authorized.

It should be noted that an electronic lock box itself could possibly be designed with a wireless transmitter and receiver device to communicate directly with a central clearinghouse computer, if desired. If the electronic lock box has an integral fingerprint sensor, or if it is interfaced to a fingerprint module (as in FIG. 5), then the electronic lock box could send the observed fingerprint data directly to the central clearinghouse computer, at which time the clearinghouse computer could perform the matching functions with its own internal database 62. Assuming a sufficient match has occurred, the clearinghouse computer could then send an authorization message back to electronic lock box, at which time the electronic lock box would allow the requested function to occur, assuming a sufficient match had occurred for the corresponding security level of the requested function. This type of system could bypass the need for an electronic key and the need for a secure memory card, if this was a viable system design for user's needs.

Figure 17:
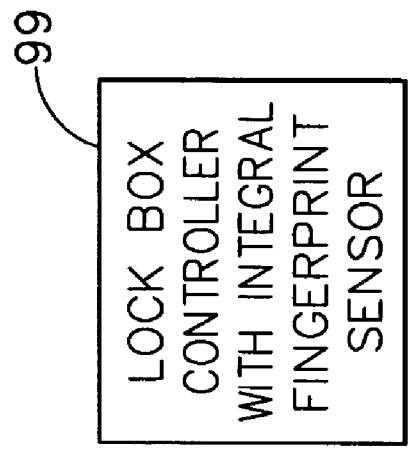
FIG. 17 is a diagrammatic view of a portion of the portable electronic lock box security system of FIG. 1, in which a fingerprint sensing module is integrated into the controller of an electronic lock box. The fingerprint module/controller combination circuit provides the observed fingerprint data, and the electronic lock box would be the repository of the fingerprint enrollment data. The electronic lock box controller makes authorization decisions in this system. (Note that, if the electronic lock box can communicate with the central clearinghouse computer, then the central database could store the fingerprint enrollment data, and the clearinghouse computer could make authorization decisions.)
Figure 16:
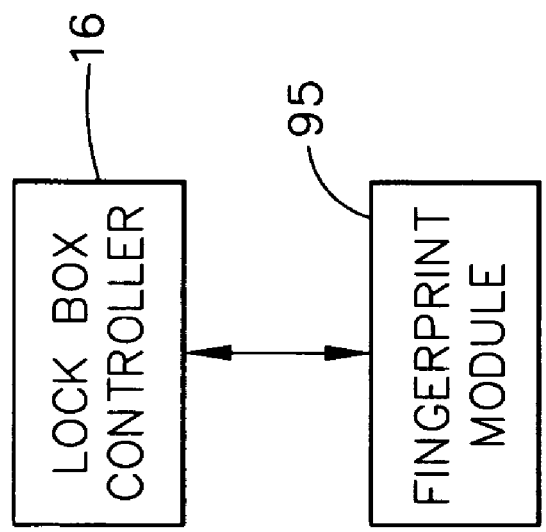
FIG. 16 is a diagrammatic view of a portion of the portable electronic lock box security system of FIG. 1, in which a separate fingerprint sensing module is in communication with the controller of an electronic lock box, and these can be the only major components of the system. The fingerprint module provides the observed fingerprint data to the electronic lock box, and the electronic lock box would be the repository of the fingerprint enrollment data. The electronic lock box controller makes authorization decisions in this system. (Note that, if the electronic lock box can communicate with the central clearinghouse computer, then the central database could store the fingerprint enrollment data, and the clearinghouse computer could make authorization decisions.)

Such an electronic lock box would likely require a larger electrical power supply and power storage device, since it probably would not be easily re-charged by typical house AC line voltage, although in some geographic areas a solar panel might be usable for keeping the electronic lock box battery charged. This type of system could have a configuration as illustrated in FIGS. 16 and 17. These systems would be true "stand-alone" systems, and have certain advantages as well as disadvantages. Much of the security built into some of the other systems that use either a secure memory device or a portable computer would be removed if using one of the systems illustrated in FIG. 16 or 17, but that might be acceptable for some real estate boards in certain areas of the country where solar power is more readily available, and sufficient confidence in the fingerprint sensors allows for this type of stand-alone system. The electronic lock box memory 21 could even have pre-stored enrollment fingerprint data, such that a user could approach such a stand-alone electronic lock box and obtain access to performing one of the electronic lock box functions without the electronic lock box even communicating with the central clearinghouse computer, if that type of "lower" security system were desirable by certain real estate boards.

The above system represents another "stand-alone" system. It should be noted that, if the biometric data enrollment process that stores "authorized" biometric data into the memory circuit of an electronic lock box is sufficiently secure, then this stand-alone embodiment may not be any less secure than the other embodiments. One way of accomplishing this could be to require that all biometric enrollment activities must occur at the REALTOR board office, using either hardware or software that is only located at that location, for example. This type of operational limitation should drastically diminish the chances that a temporarily stolen electronic lock box could be reprogrammed with a non-authorized person's biometric data as "authorized" enrollment biometric data.

There are also other embodiments described or implied herein that allow the enrollment data to be stored on a portable device, such as a secure memory card 3, an external portable computer 10 (such as a PDA, or an "electronic key"), a wireless Internet cell phone, or perhaps a combination secure memory card with a computer (sometimes called a "smart card" with computer). In all cases in which the enrollment data is not always stored in a fixed location (e.g., at a central clearinghouse computer system or at a personal computer of a real estate board office), the security of the system can be increased if the users are required to bring their portable devices to the board office, for example, to have the enrollment data stored in the memory circuits of the portable devices. This is not a "hard" requirement, but it seems like a logical recommendation.

It should be noted that virtually any of the systems described herein could work with storing the enrollment fingerprint data in a central clearinghouse computer database, so long as there is a means for communicating with that central clearinghouse computer that is sufficiently quick in real time operation. Generally speaking, some type of portable computer device with a wireless communications port will be desirable in a system by which the central clearinghouse computer database will be the sole repository of enrollment fingerprint data (or another type of enrollment biometric data that does not involve fingerprints). However, this type of operational limitation will be getting smaller and smaller in importance as cell phone coverage, especially wireless Internet coverage, continues to expand in more and more geographic areas.

Furthermore, the electronic lock box system can be set up by which a user can access the central clearinghouse computer database 62 at one moment in time, then send his or her "live" (observed) biometric data to the central clearinghouse computer 60 so that the enrollment data previously stored in database 62 can be compared to the observed (or live) fingerprint data by the computer's processing circuit 61, and if a match occurs, the central clearinghouse computer 60 can send a message back to the user's portable computer. The portable computer at that time can then store a message or set a flag (or modify some other type of variable stored in its memory) that will have a limited expiration time. This would allow the user to drive to the location of a property that is outside the cell phone coverage area, but nevertheless be able to physically take the portable computer to an electronic lock box and interface the portable computer with the electronic lock box controller 16, and pass on a command or an authorization message to inform the electronic lock box controller 16 that the central clearinghouse computer 60 had already performed (successfully) the proper authorization matching functions. The electronic lock box controller 16 would then allow the user to perform the requested function, such as attaining access to the secure compartment of the electronic lock box. This is an alternative methodology to the flow chart of FIG. 11, and it introduces a new optional step which allows the result of a matching decision (that grants access) to essentially be time-delayed until the user has a chance to move to the property to be shown to a prospective customer. An optional flow chart step 780 on FIG. 11 would allow for this function to occur, by which the authorization message will automatically expire after a certain time delay, but if the time delay period has not yet "run out," then the normal electronic lock box operation will be allowed to occur at step 776. It should be noted that, for this optional "time-delayed authorization" methodology to properly operate, the major computing devices in the system would need to be working from the same timing system, such as the use of "epoch time" that is described in detail in prior patent documents that are incorporated by reference herein. (See, for example, U.S. Pat. No. 6,989,732.) As a minimum, the electronic lock box and the portable computer would need to be using the same real time reference, for the system described above in reference to step 780 on FIG. 11. Normally, the system designer would also want the central clearinghouse computer to be working with this same real time reference.

This time-delayed authorization feature can also be used in the other flow charts, if desired. For example, in FIG. 9, an optional step 720 could occur after the access to the electronic lock box functions has been granted, to allow a user to previously enter his or her biometric data (e.g., a fingerprint) and have the secure memory card store that information along with a time-stamp that will allow the secure memory card to be presented to the electronic lock box within a certain number of minutes, for example. If that presentation occurs within the required time, then the electronic lock box will allow its normal operation to occur at step 710.

In some systems that have been described in patent documents by the same inventor, the secure memory card typically contains an encrypted data packet that, when properly decrypted and combined with other user-entered data, is analyzed to determine whether the secure memory card has "expired" at the time it is being presented to an electronic lock box for a requested function. In the optional time-delayed authorization methodology discussed above, the secure memory card can also carry a second encrypted data packet that represents the authorization that has been granted via the use of biometric data, but which is valid for a different time interval (such as thirty minutes, or sixty minutes), which then can result in the optional step 720 on the flow chart of FIG. 9 being executed.

If the biometric enrollment data has been stored on an electronic key, such as a PDA or other type of portable computer, then the optional time-delayed authorization methodology discussed above could be implemented by causing an authorization data packet to be stored on the electronic key at one moment in time, and then allowing the user to go to the site of the electronic lock box and have the electronic key communicate with that electronic lock box to download that authorization data packet to the electronic lock box, and a second moment in time. The difference between the first and second moments in time will be a controlled time interval that allows the user only a "normal" amount of time delay to accomplish that task, such as thirty or sixty minutes. Assuming everything is working properly and the biometric authorization matching occurs as expected, the result can be execution of the optional step 770 on the flow chart of FIG. 10.

In this alternative embodiment of FIG. 10, the user could "pre-program" his or her electronic key by scanning his or her fingerprint on the electronic key's biometric sensor while the user is sitting in his or her car, for example. Once properly scanned and matched to the enrollment biometric data, the user could drive to his/her customer's location, pick the customer up and then drive to the property to be "showed," which is also the location of the electronic lock box that must be accessed. Once at the location of the showing, the user is then able to place the electronic key in communication with the electronic lock box, and using the "pre-programmed" authorization information in the electronic key, the electronic lock box receives an appropriate message that allows the user to gain access to the secure compartment door, which typically contains a mechanical key to the property. All this must take place within the predetermined time interval, otherwise the pre-programmed authorization information will have expired, and access to the secure compartment door will not be forthcoming. Such a system will affirmatively defeat an unscrupulous person from stealing or "finding" an electronic key that might have been pre-programmed at an earlier time, but that pre-programming will only be operable for a limited time interval, after which the correct biometric data must be used to create a new set of "pre-programmed" authorization information in the electronic key.

In another alternative embodiment, if the biometric enrollment data has been stored on the central database 62 of the clearinghouse computer system 60, then an electronic key, such as a PDA or other type of portable computer, could be used to communicate with the clearinghouse computer system 60 to create an time-delayed authorization message. In this optional methodology, the user would scan his or her biometric data (e.g., a fingerprint) on a sensor either on-board or interfaced to the electronic key, and that observed (live) data would be transmitted to the clearinghouse computer system and compared, by processing circuit 61, to the biometric enrollment data stored in the central database 62. If desired, the type of requested function could also be transmitted to the clearinghouse computer system, in case a higher level of security might be required for a "more sensitive" requested function (such as opening the shackle of the electronic lock box, or reprogramming stored attributes of the electronic lock box).

Assuming the biometric authorization matching occurs as expected at the clearinghouse computer 60, it will transmit an authorization data packet to the electronic key that has a time-delay attribute associated with it. This will allow the user to remotely enter his/her biometric data scan at a first moment in time, and then perform other tasks (such as meeting his/her customer) before presenting the electronic key to an electronic lock box at a second moment in time. So long as the first and second moments in time are within the predetermined authorization time interval, the electronic lock box will grant the requested function, and the result can be execution of the optional step 780 on the flow chart of FIG. 11. The difference between the first and second moments in time will be a controlled time interval that allows the user only a "normal" amount of time delay to accomplish that task, such as thirty or sixty minutes. In this system, it is likely that the central clearinghouse computer will need to be running on the same time system as the electronic key and the electronic lock box.

The principles of the present invention specifically extend to electronic lock box systems made and sold by SentriLock, Inc., the assignee of the present invention and also of the patent documents listed above. It will be understood that the principles of the present invention also extend to electronic lock box systems made and sold by other companies, including Supra Products, Inc./General Electric. For example, references to electronic keys generally encompass products sold by Supra Products, Inc./General Electric. However, it will be understood that the term "electronic key" also refers to any portable computer that has the capability to communicate with a central clearinghouse computer, which many "standard" PDA's and wireless Internet devices (e.g., cell phones) could readily accomplish. In addition, it will be understood that the term "electronic key" refers to a portable computer that has the capability to communicate with an electronic lock box, which typically would require special software on board the portable computer, particularly if the portable computer is to execute some of the functions discussed herein, such as transferring biometric data to a central clearinghouse computer, or to an electronic lock box.

It will also be understood that "fingerprint data" is only one type of biometric data that can be used in the present invention, and that all references to such fingerprint data will also encompass biometric data that may not encompass human fingerprints at all, and can instead comprise other biometric measurements of human beings that can be detected by sensors, either existing today or to be designed in the future. The use of the term "fingerprint data" herein is only for the purpose of explaining a type of biometric data that can be detected with today's technology. It is expected that new types sensors will in the future become readily available that can be used as a reliable source of identifying an individual human being, and such sensors and their biometric data "readings" or "scans" will be useful for the purposes of the present invention.

It will be further understood that the references herein to a "match" occurring between the stored ("enrollment") and the observed ("live") biometric data actually has the meaning that a statistical correlation occurs between these two sets of data. As noted above, this does not necessarily require an identical match between the two data sets, but a substantial match is desired before determining a positive authentication to the current access request. Also, as noted above, the "closeness" of the correlation between these data sets can vary before allowing a requested function to be granted, depending on the security level of that requested function. If the closeness of the correlation is within a predetermined tolerance or numeric range, for example, it can then be determined (e.g., by a processing circuit) that a statistical correlation exists, and this would be considered a "sufficient correlation" for the purposes of the present invention. Note that, depending on the fineness of the resolution of the biometric sensors (e.g., the number of binary data bits) and the amount of memory storage that is allocated for holding this type of data, there may never truly be an exact match (e.g., due to numeric rounding, or truncating), but that does not necessarily mean that the observed biometric data has not properly (or sufficiently) correlated with the stored biometric data.

It will be further understood that the logical operations described in relation to the flow charts of FIGS. 9-11 can be implemented using sequential logic, such as by using microprocessor technology, or using a logic state machine, or perhaps by discrete logic; it even could be implemented using parallel processors. One preferred embodiment may use a microprocessor or microcontroller (e.g., microprocessor or CPU 16) to execute software instructions that are stored in memory cells within an ASIC. In fact, the entire microprocessor 16, along with RAM and executable ROM, may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIGS. 9-11, and discussed above, could be somewhat modified to perform similar, although not exact, functions without departing from the principles of the present invention. The exact nature of some of the decision steps and other commands in these flow charts are directed toward specific future models of electronic lock box systems (those involving electronic lock boxes made by SentriLock, Inc., for example) and certainly similar, but somewhat different, steps would be taken for use with other models or brands of electronic locking systems in many instances, with the overall inventive results being the same.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A method for operating an electronic lock box system, said method comprising:
    providing an electronic lock box with a secure compartment therein, a shackle for attachment to a fixed object, a first communications port, and a first processing circuit;
    providing a portable memory device, which interfaces to said electronic lock box processing circuit;
    providing a biometric identification device that determines observed biometric identification data of a user;
    providing a central computer, having a second processing circuit, a second communications port, and a central database that is accessible using said second processing circuit, said central database containing enrollment biometric identification data for a plurality of human users;
    providing an external portable computer that is in communication with said biometric identification device, and having a third communications port, a fourth communications port, and a third processing circuit;
    providing a first communications link between said second communications port and said third communications port;
    providing a second communications link between said first communications port and said fourth communications port;
    scanning a biometric characteristic of said user, using said biometric identification device, and determining said observed biometric identification data;
    transferring said observed biometric identification data from said biometric identification device to said external portable computer;
    transferring said observed biometric identification data from said external portable computer to said central computer;
    comparing, at said central computer; said observed biometric identification data to said enrollment biometric identification data stored in said central database, and if there is a sufficient correlation between said enrollment biometric identification data and said observed biometric identification data, transmitting an authorization message from said central computer to said external portable computer over said first communications link;
    writing authorization code data on said portable memory device, under control of said external portable computer;
    placing said portable memory device in communication with the first processing circuit of said electronic lock box, using said second communications link; and
    determining if said portable memory device contains correct authorization data to access said secure compartment of the electronic lock box, and if so authorizing access to said secure compartment.

2. The method recited in claim 1, wherein said authorization code data comprises a renewal code that extends an operating time period of said portable memory device by a predetermined amount of time.

3. The method recited in claim 2, wherein said step of determining if said portable memory device contains correct authorization data to access said secure compartment comprises determining whether said portable memory device has been renewed to the present time.

4. The method recited in claim 1, wherein said portable computer comprises one of: (a) a personal digital assistant (PDA) designed to wirelessly communicate with said central computer, and with said electronic lock box; (b) an electronic key designed to communicate with said central computer and with said electronic lock box; (c) a wireless Internet cell phone designed to wirelessly communicate with said central computer, and with said electronic lock box.

5. A method for operating an electronic lock box system, said method comprising:
providing an electronic lock box with a secure compartment therein, a shackle for attachment to a fixed object, and a first processing circuit;
providing a biometric identification device that determines first biometric identification data of a user;
communicating said first biometric identification data to a central computer system;
providing an electronic key, having a second processing circuit, a keypad, and a display;
at said central computer system, determining if a sufficient correlation occurs between the first biometric identification data and second biometric identification data that has been stored in said central computer system;
if said sufficient correlation occurs between the first biometric identification data and second biometric identification data, communicating a message to said electronic key so as to display a secure compartment access code data of the display of said electronic key; and
entering said secure compartment access code data on the keypad of said electronic key, and commanding said electronic lock box to allow access to its secure compartment.

6. The method recited in claim 5, wherein said biometric identification device is a one of: (a) fingerprint scanner; (b) a retinal scanner; and (c) a voice print identification device.

7. The method recited in claim 5, wherein:
said electronic key includes a wireless communication transmitter/receiver, and establishes a wireless communications link with said central computer system by use of said wireless communication transmitter/receiver; and
said step of communicating a message to said electronic key occurs substantially using said wireless communications link, from said central computer system.

8. The method recited in claim 5, wherein:
said electronic key includes a communications port that transmits and receives data over the Internet;
said central computer system includes a communications port that transmits and receives data over the Internet; and
said step of communicating a message to said electronic key occurs substantially using the Internet, from said central computer system.

9. The method recited in claim 5, wherein:
said electronic lock box includes a first wireless communication transmitter/receiver;
said electronic key includes a second wireless communication transmitter/receiver; and
said step of commanding said electronic lock box to allow access to its secure compartment occurs substantially using a wireless communications link, established by use of said first and second wireless communication transmitter/receivers.

10. A method for operating an electronic lock box system, said method comprising:
providing an electronic lock box with a secure compartment therein, a shackle for attachment to a fixed object, and a first processing circuit;
providing a biometric identification device that determines observed biometric identification data of a user;
providing an electronic key, having a second processing circuit and a user-controlled input device;
providing a central computer system having a memory circuit that stores enrollment biometric identification data of a plurality of users;
transmitting observed biometric identification data to said central computer system;
transmitting authorization data from said central computer system to said electronic key if a sufficient correlation occurs between the observed biometric identification data and enrollment biometric identification data that has been stored in the central computer system; and
under the control of said user, commanding said electronic lock box to allow access to its secure compartment when said authorization data is received from said central computer system, using a message sent from said electronic key to said electronic lock box.

11. The method recited in claim 10, wherein said biometric identification device is integral to said electronic lock box.

12. The method recited in claim 10, wherein said biometric identification device is integral to said electronic key.

13. The method recited in claim 10, wherein said biometric identification device is a one of: (a) fingerprint scanner; (b) a retinal scanner; and (c) a voice print identification device.

14. The method recited in claim 10, wherein:
said electronic key includes a wireless communication transmitter/receiver, and establishes a wireless communications link with said central computer system by use of said wireless communication transmitter/receiver; and
said steps of transmitting observed biometric identification data and transmitting authorization data occur substantially using said wireless communications link.

15. The method recited in claim 10, wherein:
said electronic key includes a communications port that transmits and receives data over the Internet;
said central computer system includes a communications port that transmits and receives data over the Internet; and
said steps of transmitting observed biometric identification data and transmitting authorization data occur substantially using the Internet.

16. The method recited in claim 10, wherein:
said electronic lock box includes a first wireless communication transmitter/receiver;
said electronic key includes a second wireless communication transmitter/receiver; and
said step of commanding said electronic lock box to allow access to its secure compartment occurs substantially using a wireless communications link, established by use of said first and second wireless communication transmitter/receivers.

17. A method for operating an electronic lock box system, said method comprising:
providing an electronic lock box with a secure compartment therein, a shackle for attachment to a fixed object, and a first processing circuit;

providing a biometric identification device that determines observed biometric identification data of a user;

providing an electronic key, having a second processing circuit;

providing a central computer system having a memory circuit that stores enrollment biometric identification data of a plurality of users;

transmitting said observed biometric identification data to said electronic key;

upon inquiry by said electronic key, transmitting enrollment biometric identification data from said central computer system to said electronic key; and at said electronic key, authorizing secure compartment access if a sufficient correlation occurs between said observed biometric identification data and said enrollment biometric identification data downloaded from the central computer system, by commanding said electronic lock box to allow access to its secure compartment, using a message sent from said electronic key to said electronic lock box.

18. The method recited in claim 17, wherein said biometric identification device is integral to said electronic lock box.

19. The method recited in claim 17, wherein said biometric identification device is integral to said electronic key.

20. The method recited in claim 17, wherein said biometric identification device is a one of: (a) fingerprint scanner; (b) a retinal scanner; and (c) a voice print identification device.

21. A method for operating an electronic lock box system, said method comprising:

providing an electronic lock box with a secure compartment therein, a shackle for attachment to a fixed object, and a first processing circuit;

providing a biometric identification device that determines observed biometric identification data of a user;

providing a central computer, having a second processing circuit, a first communications port, and a central database that is accessible using said second processing circuit, said central database containing enrollment biometric identification data for a plurality of human users;

providing an external portable computer that is in communication with said biometric identification device, said external portable computer having a second communications port and a third processing circuit;

providing a portable memory device, which contains read/write memory elements for storing data, said portable memory device being communicable with at least one of: (a) said first processing circuit of the electronic lock box, and (b) said third processing circuit of the external portable computer;

providing a first communications link between said first communications port and said second communications port;

scanning a biometric characteristic of said user, using said biometric identification device, and determining said observed biometric identification data;

transferring said observed biometric identification data from said biometric identification device to said external portable computer;

transferring said observed biometric identification data from said external portable computer to said central computer, over said first communications link;

comparing, at said central computer; said observed biometric identification data to said enrollment biometric identification data stored in said central database, and if there is a sufficient correlation between said enrollment biometric identification data and said observed biometric identification data, transmitting an authorization message from said central computer to said external portable computer over said first communications link;

writing authorization code data on said portable memory device, under control of said external portable computer;

placing said portable memory device in communication with the first processing circuit of said electronic lock box; and determining if said portable memory device contains correct authorization data to access said secure compartment of the electronic lock box, and if so authorizing access to said secure compartment.

22. The method recited in claim 21, wherein: said step of placing said portable memory device in communication with the first processing circuit of said electronic lock box comprises one of:

(a) physically connecting said portable memory device with said electronic lock box by use of a first reader port; and (b) physically connecting said portable memory device with said external portable computer by use of a second reader port, and establishing a second communications link between said external portable computer and said electronic lock box, so that data is transferable therebetween.

23. The method recited in claim 22, wherein said second communications link comprises wireless communications.

24. The method recited in claim 21, wherein said first communications link comprises one of: (a) a mobile cellular telephone link, and (b) a wireless Internet communication link.

25. The method recited in claim 21, wherein said authorization code data comprises a renewal code that extends an operating time period of said portable memory device by a predetermined amount of time.

26. The method recited in claim 25, wherein said step of determining if said portable memory device contains correct authorization data to access said secure compartment comprises determining whether said portable memory device has been renewed to the present time.

27. The method recited in claim 21, wherein said portable computer comprises one of: (a) a personal digital assistant (PDA) designed to wirelessly communicate with said central computer, and with said electronic lock box; (b) an electronic key designed to communicate with said central computer and with said electronic lock box; (c) a wireless Internet cell phone designed to wirelessly communicate with said central computer, and with said electronic lock box.

* * * * *